United States Patent
Liu et al.

(10) Patent No.: US 12,086,467 B2
(45) Date of Patent: *Sep. 10, 2024

(54) READ PERFORMANCE OF MEMORY DEVICES

(71) Applicant: Macronix International Co., Ltd., Hsinchu (TW)

(72) Inventors: Ting-Yu Liu, Hsinchu (TW); Yi-Chun Liu, Zhubei (TW)

(73) Assignee: Macronix International Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,726

(22) Filed: Feb. 28, 2023

(65) Prior Publication Data

US 2023/0214158 A1 Jul. 6, 2023

Related U.S. Application Data

(63) Continuation of application No. 16/863,202, filed on Apr. 30, 2020, now Pat. No. 11,645,006.

(51) Int. Cl.
*G06F 3/06* (2006.01)
*G06F 12/10* (2016.01)
*G06F 12/123* (2016.01)

(52) U.S. Cl.
CPC .......... *G06F 3/0659* (2013.01); *G06F 3/0604* (2013.01); *G06F 3/0674* (2013.01); *G06F 12/10* (2013.01); *G06F 12/124* (2013.01)

(58) Field of Classification Search
CPC .... G06F 3/0659; G06F 3/0604; G06F 12/124; G06F 12/10; G06F 3/0674
See application file for complete search history.

(56) References Cited

U.S. PATENT DOCUMENTS

| | | |
|---|---|---|
| 10,866,898 B2 | 12/2020 | Lee |
| 2013/0132638 A1 | 5/2013 | Horn et al. |
| 2017/0075812 A1 | 3/2017 | Wu et al. |
| 2017/0270045 A1 | 9/2017 | Kwon et al. |
| 2019/0286555 A1 | 9/2019 | Park |
| 2020/0004692 A1 | 1/2020 | Fan et al. |
| 2021/0303480 A1* | 9/2021 | Keller ................. G06F 12/0824 |

* cited by examiner

*Primary Examiner* — Mark A Giardino, Jr.
(74) *Attorney, Agent, or Firm* — Fish & Richardson P.C.

(57) ABSTRACT

A memory controller managing a memory device receives a memory read command from a host device that is communicably coupled to the memory device. The memory device includes a storage memory comprising a first type of memory cells and a cache memory comprising a second type of memory cells. The memory controller determines, from the memory read command, a physical address of a target memory location in the storage memory indicated by the memory read command. The memory controller executes a read operation on the target memory location corresponding to the physical address. The memory controller determines a read attribute of the target memory location. Conditioned on determining that the read attribute satisfies one or more threshold conditions, the memory controller programs an entry in the cache memory with information corresponding to the target memory location.

20 Claims, 10 Drawing Sheets

READ PERFORMANCE OF MEMORY DEVICES

CROSS-REFERENCE TO RELATED APPLICATIONS

This application is a continuation of and claims priority to U.S. patent application Ser. No. 16/863,202, filed on Apr. 30, 2020, the entire contents of which are incorporated here by reference.

TECHNICAL FIELD

The following disclosure relates generally to memory devices, and in particular, to methods, apparatus and systems related to improving read performance of semiconductor memory devices.

BACKGROUND

A semiconductor memory device includes storage memory, e.g., flash memory, and a memory controller that manages the storage memory. The memory controller receives commands from a host device to perform operations on the storage memory.

SUMMARY

The present disclosure describes methods, apparatus and systems to improve read performance of a semiconductor memory device. The memory device includes a storage memory with plural-level memory cells for storing data, and a memory controller to manage read or write access to the storage memory by a host device that is coupled to the memory device. The memory device also includes a cache memory with single-level cells (SLC), for mirroring data from the storage memory that are accessed frequently for read commands by the host device within a known threshold parameter, for example, within the most recent T units of time (where T is a positive integer in the order of microseconds, milliseconds, or seconds), or the most recent N number of read commands (where N is a positive integer), or both. The memory controller identifies data in the storage memory that are accessed for read commands and that satisfy the known threshold parameter(s) using a data identification process; copies the identified data from the storage memory to memory locations in the cache memory; and includes a mapping entry in an address translation table to read the data from the cache memory when the next read command is received from the host device. When the cache memory is full or the data in the cache is to be updated, or both, the memory controller evicts a data entry from the cache memory using an eviction process, and removes the corresponding mapping entry from the address translation table.

In some implementations, the plural-level cells (PLC) in the storage memory include one or more of multi-level (two-level) cells (MLC), triple-level cells (TLC), or quad-level cells (QLC). In some implementations, the memory controller includes a read tracking data structure with N entries that correspond to the N storage memory locations that have been accessed most recently for read operations. In some implementations, the data corresponding to the N entries in the read tracking data structure are also mirrored in the cache memory. When a new read command is received, targeted at a memory location in the storage memory different from those mapped to the N entries in the read tracking data structure, the memory controller adds the target memory location to an entry at the head of the read tracking data structure. If all entries in the read tracking data structure are full, the memory controller evicts the least recently used entry from the read tracking data structure.

In some implementations, data corresponding to a subset of the N entries in the read tracking data structure that are within a certain time window are mirrored in the cache memory. For example, in such implementations, the memory controller maintains a delta window that corresponds to the recent T units of time from the present time instant, and P entries in the read tracking data structure (P is a positive integer ≤N) correspond to P storage memory locations that have been accessed for read operations within the delta window. A mirror flag is associated with one each of these P entries. If the mirror flag for a P entry is set to a copy value, then the corresponding memory data is mirrored between the storage memory and the cache memory. When a new read command is received, and the targeted memory location has a corresponding P entry, the memory controller checks if the mirror flag is set to the copy value, which indicates that data at the targeted storage memory location has already been mirrored to the cache memory. If the mirror flag is not set to the copy value, the memory controller copies the data from the targeted storage memory location to a location in the cache memory, and sets the mirror flag for the entry in the read tracking data structure to the copy value.

In some implementations, data corresponding to a subset of the N entries in the read tracking data structure that satisfy a read count (RC) threshold value are mirrored in the cache memory. For example, in such implementations, the memory controller tracks the read count for each entry in the read tracking data structure. Entries having a read count that satisfy a known RC threshold value have corresponding memory data mirrored between the storage memory and the cache memory. When a new read command is received, and the targeted memory location has a corresponding entry in the read tracking data structure, the memory controller increments the read count for the entry. If the read count prior to the increment did not satisfy the RC threshold value (which indicates that the corresponding memory data had not been mirrored to the cache memory), but the incremented read count satisfies the RC threshold value, the memory controller copies the data from the targeted storage memory location to a location in the cache memory.

In some implementations, data corresponding to a subset of the N entries in the read tracking data structure that are both within a certain time window and satisfy a RC threshold value are mirrored in the cache memory. For example, in such implementations, the memory controller maintains a delta window that corresponds to the recent T units of time from the present time instant, and P entries in the read tracking data structure correspond to P storage memory locations that have been accessed for read operations within the delta window. The memory controller also tracks the read count for each entry in the read tracking data structure, with entries with read counts that satisfy the RC threshold value having corresponding memory data mirrored between the storage memory and the cache memory. When a new read command is received, and the targeted memory location has a corresponding entry in the read tracking data structure, the memory controller increments the read count for the entry. If the read count prior to the increment did not satisfy the RC threshold value but the incremented read count satisfies the RC threshold value, and the entry is one of the existing P entries in the delta window, the memory controller copies the data from the targeted storage memory location to a location in the cache memory. If the entry was not one of the existing P entries in the delta window, then the entry is added to the delta window with the incremented read count, but the corresponding data is not copied over from the targeted storage memory location. In some implementations, a mirror flag is associated with one each of the N entries. The mirror flag for an entry is set to a copy value when the corresponding memory data is mirrored between the storage memory and the cache memory.

In some implementations, the memory device includes multiple levels of cache memory. In such implementations, different levels of cache memory are composed of different types of memory cells. For example, a first level of cache memory that is used to mirror data directly from the storage memory can be composed of TLC memory blocks. A second level of cache memory can be used to mirror a subset of the data from the first level memory; the second level cache memory can be composed of SLC memory blocks. One or more additional levels of cache memory can be used to mirror a subset of the data from the second level memory; these additional levels of cache memory can be composed of phase change memory (PCM), magnetoresistive random access memory (MRAM), dynamic random access memory (DRAM), among other suitable types of memory. In some implementations, only one of the second level or additional levels of cache memory is used, in addition to the first level of cache memory. In some implementations, the second level or one or more additional levels of cache memory are implemented in the host device, and controlled by the memory controller.

In a general aspect, a memory controller managing a memory device receives a memory read command from a host device that is communicably coupled to the memory device. The memory device includes a storage memory comprising a first type of memory cells and a cache memory comprising a second type of memory cells. The memory controller determines, from the memory read command, a physical address of a target memory location in the storage memory indicated by the memory read command. The memory controller executes a read operation on the target memory location corresponding to the physical address. The memory controller determines a read attribute of the target memory location. Conditioned on determining that the read attribute satisfies one or more threshold conditions, the memory controller programs an entry in the cache memory with information corresponding to the target memory location.

Particular implementations may include one or more of the following features. In some implementations, determining the physical address of the target memory location comprises determining that the physical address corresponds to a first memory location in the storage memory without an associated memory location in the cache memory. In such implementations, the memory controller executes the read operation on the first memory location in the storage memory. The memory controller determines whether an entry corresponding to the first memory location is present in a read tracking data structure, the read tracking data structure including a plurality of entries indicating recent frequently read memory locations in the storage memory, wherein the recent frequently read memory locations correspond to a threshold number of most recently accessed memory locations in the storage memory. Conditioned on determining that the read tracking data structure includes a particular entry corresponding to the first memory location, the memory controller moves the particular entry to a head of the read tracking data structure. Conditioned on determining that the read tracking data structure does not include an entry corresponding to the first memory location, the memory controller copies data from the first memory location in the storage memory to a second memory location in the cache memory, and adds a new entry to the read tracking data structure indicating the first memory location in the storage memory. In some implementations, copying the data from the first memory location in the storage memory to the second memory location in the cache memory comprises determining that the cache memory is full. In response to the determining, the memory controller identifies a least recently used (LRU) entry in the read tracking data structure; removes from the cache memory, data corresponding to the LRU entry; and removes the LRU entry from the read tracking data structure. Following removing the data corresponding to the LRU entry from the cache memory, the memory controller copies the data from the first memory location in the storage memory to the second memory location in the cache memory. Following removing the LRU entry from the read tracking data structure, the memory controller adjusts positions of existing entries in the read tracking data structure, and adds the new entry to the head of the read tracking data structure.

In some implementations, determining the physical address of the target memory location comprises determining that the physical address corresponds to a first memory location in the storage memory without an associated memory location in the cache memory. In such implementations, the memory controller executes the read operation on the first memory location in the storage memory. The memory controller determines that an entry corresponding to the first memory location is present in a read tracking data structure, the read tracking data structure including a plurality of entries indicating recent frequently read memory locations in the storage memory, wherein the recent frequently read memory locations correspond to a threshold number of most recently accessed memory locations in the storage memory. In response to determining that the read tracking data structure includes the entry corresponding to the first memory location, the memory controller determines whether the entry is included in a delta window, wherein the delta window includes a subset of entries in the read tracking data structure that have been accessed using read commands from the host device within a known time interval, the subset of entries including an entry at the head of the read tracking data structure. Conditioned on determining that the entry is included in the delta window, the memory controller moves the entry to the head of the read tracking data structure. The memory controller determines whether a data mirror flag for the entry is set to a copy value, wherein the copy value for the data mirror flag indicates that data from the first memory location in the storage memory is to be copied to a second memory location in the cache memory. Upon determining that the data mirror flag for the entry is set to the copy value, the memory controller copies data from the first memory location in the storage memory to a second memory location in the cache memory. Upon determining that the data mirror flag for the entry is not set to the copy value, the memory controller sets the data mirror flag for the entry to the copy value. Conditioned on determining that the entry is not included in the delta window, the memory controller moves the entry to the head of the read tracking data structure, wherein the entry is included in the delta window, and sets the data mirror flag for the entry to the copy value.

In some implementations, determining the physical address of the target memory location comprises determining that the physical address corresponds to a first memory location in the storage memory without an associated memory location in the cache memory. In such implementations, the memory controller executes the read operation on the first memory location in the storage memory. The memory controller determines that an entry corresponding to the first memory location is present in a read tracking data structure, the read tracking data structure including a plurality of entries indicating recent frequently read memory locations in the storage memory, wherein the recent frequently read memory locations correspond to a threshold number of most recently accessed memory locations in the storage memory. In response to determining that the read tracking data structure includes the entry corresponding to the first memory location, the memory controller moves the entry to the head of the read tracking data structure, increments a read count for the entry, and determines whether the incremented read count for the entry satisfies a threshold read count value, wherein entries in the read tracking data structure with respective read counts satisfying the threshold read count value correspond to memory locations in the storage memory having data mirrored to memory locations in the cache memory. Upon determining that the incremented read count for the entry satisfies the threshold read count value, the memory controller copies data from the first memory location in the storage memory to a second memory location in the cache memory.

In some implementations, determining the physical address of the target memory location comprises determining that the physical address corresponds to a first memory location in the storage memory without an associated memory location in the cache memory. In such implementations, the memory controller executes the read operation on the first memory location in the storage memory. The memory controller determines that an entry corresponding to the first memory location is present in a read tracking data structure, the read tracking data structure including a plurality of entries indicating recent frequently read memory locations in the storage memory, wherein the recent frequently read memory locations correspond to a threshold number of most recently accessed memory locations in the storage memory. In response to determining that the read tracking data structure includes the entry corresponding to the first memory location, the memory controller increments a read count for the entry, and determines whether the entry is included in a delta window, wherein the delta window includes a subset of entries in the read tracking data structure that have been accessed using read commands from the host device within a known time interval, the subset of entries including an entry at the head of the read tracking data structure. Conditioned on determining that the entry is included in the delta window, the memory controller moves the entry to the head of the read tracking data structure, and determines whether the incremented read count for the entry satisfies a threshold read count value, wherein entries in the read tracking data structure with respective read counts satisfying the threshold read count value correspond to memory locations in the storage memory having data mirrored to memory locations in the cache memory. Conditioned on determining that the incremented read count for the entry satisfies the threshold read count value, the memory controller copies data from the first memory location in the storage memory to a second memory location in the cache memory, and sets data mirror flag for the entry to indicate that data from the first memory location in the storage memory is copied to the second memory location in the cache memory. Conditioned on determining that the entry is not included in the delta window, the memory controller moves the entry to the head of the read tracking data structure, wherein the entry at the head of the read tracking data structure is included in the delta window.

In some implementations, executing the read operation on the target memory location comprises the memory controller obtaining data from the target memory location, and sending the data to the host device.

In some implementations, the memory read command includes a logical address corresponding to the target memory location. In such implementations, determining the physical address of the target memory location comprises the memory controller accessing an address translation data structure that includes a plurality of entries mapping logical addresses of memory locations sent by the host device to physical addresses of memory locations in the memory device, and selecting, using the logical address included in the memory read command, an entry from the plurality of entries in the address translation data structure, the entry providing a mapping between the logical address included in the memory read command and the physical address of the target memory location.

In some implementations, programming the entry in the cache memory with information corresponding to the target memory location comprises modifying the entry in the address translation data structure to include a memory address of a cache memory location corresponding to the programmed entry in the cache memory.

In some implementations, determining a read attribute of the target memory location and programming an entry in a cache memory with information corresponding to the target memory location conditioned on determining that the read attribute satisfies one or more threshold conditions comprises the memory controller programming an entry in a first-level cache memory with information corresponding to the target memory location upon determining that a first read attribute of the target memory location satisfies a first threshold condition. Upon determining that the first read attribute of the target memory location satisfies the first threshold condition and a second read attribute of the target memory location satisfies a second threshold condition, the memory controller programs an entry in a second-level cache memory with information corresponding to the target memory location, wherein the second-level cache memory includes a buffer in the host device.

In some implementations, the first read attribute includes a parameter indicating a time the target memory location was accessed, and the second read attribute includes one of a read count or an access time interval.

In some implementations, the first type of memory cells in the storage memory includes one of a multi-level cell (MLC) memory, a triple-level cell (TLC) memory, or a quad-level cell (QLC) memory, and the second type of memory cells in the cache memory includes a single-level cell (SLC) memory.

Implementations include a memory device comprising a storage memory including a first type of memory cells; a cache memory including a second type of memory cells; and a memory controller to manage access to the storage memory and the cache memory, wherein the memory controller is configured to perform the above-described operations. Implementations also include a memory controller for managing a memory device, where the memory controller comprises one or more processors; and one or more machine-readable media storing instructions that, when executed, cause the one or more processors to perform the above-described operations.

Implementations further include non-transitory computer-readable media and systems. One such non-transitory computer-readable media stores instructions that, when executed, cause one or more processors to perform the above-described operations. One such system includes a memory device with a memory controller to manage access to a storage memory and a cache memory in the memory device, wherein the memory controller is configured to perform the above-described operations. In some implementations, the system includes a host device communicably coupled to memory device and configured to access the storage memory.

Using the novel features described above and in the following sections of this specification, the lifetime or performance, or both, of semiconductor memory devices, for example, flash memory devices, can be improved. SLC memory cells have higher block endurance compared to, for example, TLC or QLC memory cells due to higher program/erase cycles. SLC memory cells also have lower read disturbance compared to TLC or QLC memory cells because SLC requires less frequent refresh to avoid data corruption, which leads to longer lifetime of SLC memory cells compared to TLC or QLC. The plural-level memory cells, due to their higher density, also have longer "busy times" (for example, more iterations inside the flash memory device) and higher bit error rates (BER) (which cause, for example, more iterations in the error correction circuit); this leads to read latency of PLC memory cells is higher compared to SLC memory cells. Accordingly, by using a SLC cache memory to mirror data of recent frequently read storage memory locations, the disclosed techniques enable the memory controller to respond to read commands, directed to these recent frequently read storage memory locations, by accessing the corresponding mirrored data from the SLC memory cache. In doing so, the disclosed techniques enable responses to the read commands with lower read latency, which can lead to improved performance for read operations. Also, by avoiding accesses to the plural-level memory cells in the storage memory for these read commands, the disclosed techniques mitigate effects of program/erase cycles or read disturbance, or both in the storage memory, which can help to improve the storage lifetime of the PLC storage memory. In this manner, the disclosed techniques enhance storage lifetime and improve read performance for memory devices.

The disclosed techniques can be applied to various types of non-volatile memory devices, such as NAND flash memory, NOR flash memory, or PCM, among others. Additionally or alternatively, the techniques can be applied to various types of main or cache memory devices, such as static random access memory (SRAM), DRAM, resistive random access memory (ReRAM), or MRAM, among others.

The details of one or more disclosed implementations are set forth in the accompanying drawings and the description below. Other features, aspects, and advantages will become apparent from the description, the drawings and the claims.

BRIEF DESCRIPTION OF THE DRAWINGS

Like reference numbers in the figures indicate like elements.

DETAILED DESCRIPTION

Figure 1:
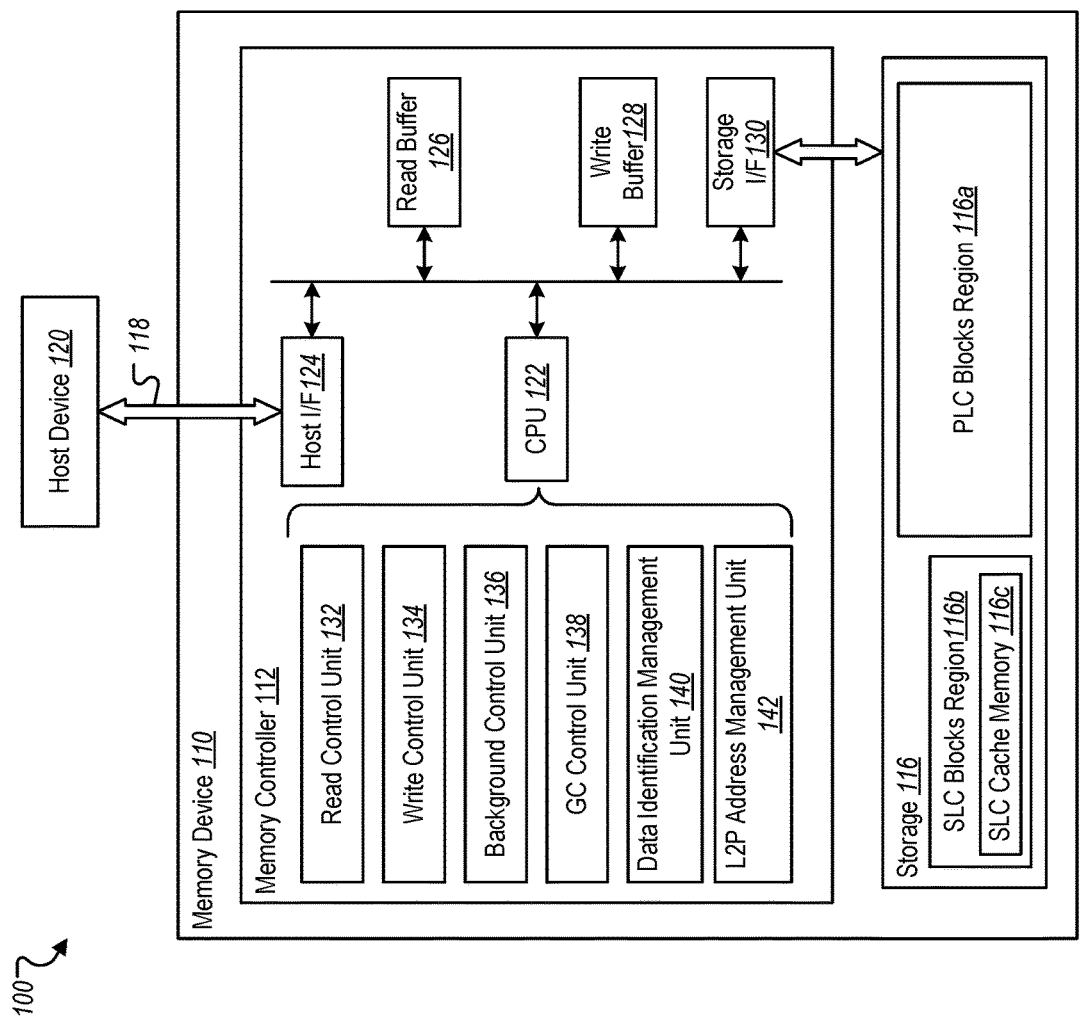
FIG. 1 illustrates a block diagram of an example system that uses a cache memory in a memory device for read operations.

FIG. 1 illustrates a block diagram of an example system 100 that uses a cache memory in a memory device for read operations. The system 100 includes the memory device 110 that is coupled to a host device 120 using a bus 118. The memory device 110 includes a memory controller 112 and a storage section 116.

In some implementations, the memory device 110 is a storage device. For example, the memory device 110 can be an embedded multimedia card (eMMC), a secure digital (SD) card, a solid-state drive (SSD), or some other suitable storage. In some implementations, the memory device 110 is a client device that is coupled to a host device 120. For example, the memory device 110 can be an SD card that is coupled to a digital camera or a media player as the host device 120.

The memory controller 112 manages access to, and operations performed on, the storage section 116. The following sections describe the various techniques based on implementations in which the memory controller 112 is used to manage the storage section 116. However, the techniques described in the following sections are also applicable in implementations in which another type of controller in the memory device 110, different from a memory controller, is used to manage the storage section 116.

In some implementations, the storage section 116 is a non-volatile memory, for example, a NAND or NOR flash memory, or some other suitable non-volatile memory. In implementations where the storage section 116 is NAND or NOR flash memory, the memory device 110 is a flash memory device, e.g., a flash memory card, and the memory controller 112 is a flash controller. For example, in some cases, the memory device 110 is a Serial Peripheral Interface (SPI) device, with the storage memory being NOR or NAND flash memory. For illustration purposes, the following description uses a flash memory as an example of the storage section 116.

As shown, the storage section 116 is compartmentalized into two parts: a PLC blocks region 116a, and a SLC blocks region 116b. The PLC blocks region 116a is composed of one of MLC, TLC, QLC, or higher level memory cells (collectively referred to as PLC memory cells), while the SLC blocks region 116b is composed of SLC memory cells. In some implementations, the PLC blocks region 116a is configured for long-term storage of data or instructions, or both, while the SLC blocks region 116b is configured for short term storage of data and/or instructions, for example, high priority data and/or instructions. In some implementations, the SLC blocks region 116b realizes an SLC cache memory 116c that is used by the memory controller 112 to store data corresponding to a number of recent most frequently read storage locations in the PLC blocks region 116a. In some cases, the SLC cache memory 116c is a portion of the SLC blocks region 116b. In other cases, the SLC cache memory 116c is formed of all of the SLC blocks region 116b.

In this context, an SLC memory cell stores one bit of data per memory cell; an MLC memory cell stores two bits of data per memory cell; a TLC memory cell stores three bits of data per memory cell; a QLC memory cell stores four bits of data per memory cell; and a higher level memory cell beyond QLC stores five or more bits of data per memory cell. As noted previously, SLC memory has higher write speeds, lower power consumption and higher cell endurance than PLC memory. However, because SLC memory stores less data per memory cell than any of PLC memory, SLC memory costs more per megabyte of storage to manufacture. As described below, the disclosed techniques realize memory devices that provide the performance advantages of SLC memory by storing recent frequently read data in the SLC cache memory 116c, while also limiting the manufacturing cost of the memory devices by storing bulk of the data in the lower cost PLC blocks region 116a.

The memory controller 112 is a general-purpose microprocessor or microcontroller, or an application specific integrated circuit (ASIC) chip, among other suitable types. The memory controller 112 communicates with the host device 120 using a host interface (I/F) 124, and with the storage section 116 using a storage I/F 130. The memory controller 112 receives write or read commands from the host device 112 at the host IF/124, and uses a central processing unit (CPU) 122 to perform operations on the storage section 116 through the storage I/F 130.

The operations performed by the memory controller 112 are divided into instruction units depending on the type of operation. For example, the memory controller 112 uses instructions corresponding to the read control unit 132 to manage read operations in the storage section 116, upon receiving read commands from the host device 120. When sending selected data to the host device 120 in response to a read command, the memory controller 112 temporarily stores the data in the read buffer 126 until the data is transmitted to the host device 120 through the host I/F 124. The memory controller 112 uses instructions corresponding to the write control unit 134 to manage write or program operations in the storage section 116, upon receiving write or program commands from the host device 120. When writing data to the storage section 116 in response to a write command (for example, programming a memory location in the PLC blocks region 116a upon receiving data from the host device 120), the memory controller 112 temporarily stores the receive data in the write buffer 128 until the data is fully written to the write section 116 through the storage I/F 130.

The memory controller 112 uses instructions corresponding to the background control unit 136 to perform housekeeping operations during idle times, for example, when there are no read or write commands from the host device 120 being serviced. The housekeeping operations include maintain bad memory blocks in the storage section 116, refresh operation of memory blocks in the in the storage section 116, wear leveling operations to optimize lifetime or performance of the storage section 116, among others. The memory controller 112 uses instructions corresponding to the garbage collection (GC) control unit 138 to perform GC operations on the storage section, for example, when erasing data from memory blocks. In some implementations, the GC unit 138 is used for garbage collection during execution time, for example, in conjunction with a write command or an erase command, among others. In some implementations, the memory controller 112 performs data mirroring operations between the PLC blocks region 116a and the SLC cache memory 116c, as detailed in this disclosure, as a background operation. In such implementations, the data mirroring is performed using the background control unit 136.

The memory controller 112 uses instructions corresponding to the data identification management unit 140 to identify recent frequently read data for storing in the SLC cache memory 116c, and to manage the cache memory, for example, to evict least recently used (LRU) entries from the cache memory to make space for new entries when the cache memory is full. The memory controller 112 uses instructions corresponding to the L2P address management unit 142 to manage entries in an address translation data structure, which map logical memory addresses from the host device to physical addresses of memory locations in the PLC blocks region 116a or the SLC blocks region 116b, or to memory locations in the SLC cache memory 116c when data entries are present in the cache memory. The operations performed by the data identification management unit 140 and the L2P address management unit 142 are described in greater detail in the following sections.

In some implementations, the instruction units in the memory controller 112, for example, one or more of the read control unit 132, write control unit 134, background control unit 136, GC control unit 138, data identification management unit 140, or L2P address management unit 142, are realized as hardware instruction units, for example, using hardware circuitry in an ASIC chip implementing the memory controller 112. In other implementations, the instruction units are realized as software routines programmed in the memory controller chip, where the software routines are accessed and executed by the CPU 122.

As noted above, the memory controller 112 uses the SLC cache memory 116c to store memory data of recent frequently read memory locations in the PLC blocks region 116a. In some implementations, the memory controller identifies memory locations in the PLC blocks region 116a as recent frequently read memory locations if these memory locations are accessed for read commands within a specified time interval from the current time, for example, within the last T milliseconds (or microseconds). The memory data are stored as separate entries in memory locations in the SLC cache memory 116c, with a mapping between the physical address of the memory locations in the PLC blocks region 116a and the physical address of the corresponding memory locations in the SLC cache memory 116c provided in respective entries in an address translation data structure. One or more entries in the address translation data structure each also includes a mapping between the logical address sent by the host device 120, and the physical addresses of the memory locations in the storage section 116: the physical address of the memory location in the PLC blocks region 116a, or also including the physical address of the corresponding memory location in the SLC cache memory 116c for data that are mirrored in the SLC cache memory 116c.

In some implementations, the memory controller 112 stores a specified number of entries in the SLC cache memory 116c. The number of entries is limited by the size of the SLC cache memory 116c, where the size of the SLC cache memory 116c is less than the size of the PLC blocks region 116a. For example, the PLC blocks region 116a can be in the order of multiples of megabytes (MB), multiples of gigabyte (GB), multiples of terabyte (TB), among other suitable values. The SLC cache memory 116c can store multiples of entries, among other suitable values.

In some implementations, in addition to storing recent frequently read data in the SLC cache memory 116c, the memory controller 112 stores frequently written data in the SLC cache memory 116c, for example, data for memory locations in the PLC blocks region 116a that are updated with a frequency above certain threshold values. However, in the following sections, the disclosed techniques are described with respect to recent frequently read data, without loss of generality.

When the memory controller 112 determines that a memory location (e.g., a page or block of memory) in the PLC blocks region 116a is frequently read, the memory controller 112 copies the memory location to the SLC cache memory 116c to protect the corresponding PLC memory cells in the PLC blocks region 116a. Otherwise, frequent reads on the PLC memory locations can lead to read disturbance of the memory locations.

The memory controller 112 uses the data identification management unit 140 to identify memory locations in the PLC blocks region 116a that are frequently read. In some implementations, the data identification management unit 140 identifies data attributes of memory locations in the PLC blocks region 116a, distinguishing among five different types of data attributes: (a) memory locations that are frequently written and frequently read; (b) memory locations that are frequently written but seldom read; (c) memory locations that are seldom written and seldom read; (d) memory locations that are seldom written but frequently read; and (d) memory locations that are unmapped, for example, no data written yet.

Among memory locations with these different types of data attributes, the disclosed techniques are described with respect to memory locations having attribute (d): seldom written but frequently read. The memory controller 112 mirrors, to the SLC cache memory 116c, memory locations having the attribute (d). The number of memory locations with attribute (d) that are written to the SLC cache memory 116c is dependent on the size of the SLC cache memory 116c.

In some implementations, the data attribute information of the memory locations in the PLC blocks region 116a are stored in a SRAM during runtime, for example, when the memory device 110 is powered on and active. In some implementations, the data attribute information is stored in a known location in the storage section 116 (for example, in a memory block or page in the PLC blocks region 116a or the SLC blocks region 116b) before the memory device 110 is powered down. In other implementations, the data attribute information is reset upon every power cycle of the memory device 110. Using the data attribute information, the memory controller 112 manages mirroring of memory locations in the SLC cache memory 116c using one or more of the techniques described in the following sections. Although the following sections describe that the memory controller 112 mirrors data between the PLC blocks region 116a and the SLC cache memory 116c following servicing read commands from the host device 120, in some implementations, the memory controller 112 also performs data mirroring using the disclosed techniques after servicing write commands from the host device 120.

FIGS. 2A-2D illustrate examples of techniques 200A-200D used by a memory controller to manage mirroring of recent frequently read memory locations to a SLC cache memory. In some implementations, the techniques 200A-200D are used by the memory controller 112 to mirror recent frequently read memory locations in the PLC blocks region 116a to the SLC cache memory 116c. Accordingly, the following sections describe the techniques 200A-200D with respect to the system 100.

Each of FIGS. 2A-2D shows a number of entries mapping to memory locations in an SLC cache memory, e.g., SLC cache memory 116c, as discussed in greater detail below. Each location in the SLC cache memory stores a copy of memory data corresponding to a memory location in the PLC blocks region 116a, with a mapping between the address of the memory location in the SLC cache memory 116c and the address of the memory location in the PLC blocks region 116a stored in an address translation data structure, for example, address translation data structure 310 described with respect to FIG. 3 below.

As shown in FIGS. 2A-2D, in some implementations, the memory controller 112 tracks memory locations storing data in the SLC cache memory 116c using entries in a read tracking data structure, such as a list, queue, or some other suitable data structure. The first entry or start of the data structure, also referred to as the "head," is an entry that corresponds to a memory location in the SLC cache memory 116c that has been read most recently read compared to other memory locations in the SLC cache memory. The last entry or end of the data structure, also referred to as the "tail," is an entry that corresponds to a memory location in the SLC cache memory 116c that has been read least recently compared to other memory locations in the SLC cache memory. In some cases, entries near or at the head are known as "very hot" entries (for example, indicating that they have been accessed very recently for read operations), while entries near or at the tail are known as "hot" entries (for example, indicating that they have been accessed less recently for read operations compared to very hot entries, but more recently than other memory locations in the PLC blocks region 116a that are not in the SLC cache memory 116c). In some implementations, the memory controller 112 stores the data structure in temporary memory (for example, SRAM) during runtime of the memory device 110. In other implementations, the memory controller 112 stores the data structure in a location in the memory section 116 (for example, in the PLC blocks region 116a or the SLC blocks region 116b), or in a register.

Figure 2A:
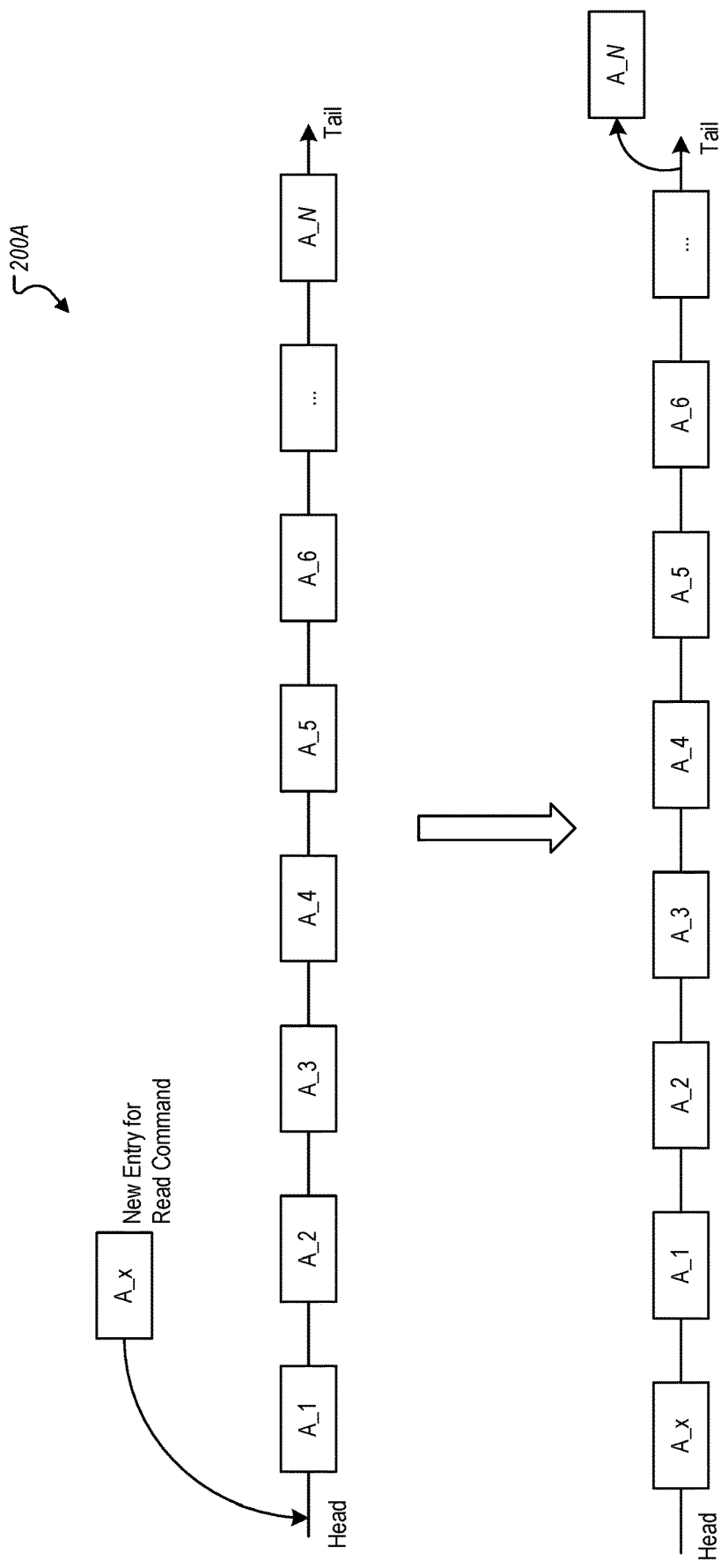
FIGS. 2A-2D illustrate examples of techniques used by a memory controller to manage mirroring of recent frequently read memory locations to a SLC cache memory.

In some implementations, the memory controller 112 uses the technique 200A illustrated with respect to FIG. 2A. As shown in the figure, the read tracking data structure includes N entries A_1, A_2, A_3, A_4, A_5, A_6, up to A_N, which correspond to N memory locations in the SLC cache memory 116c mirroring data for the most recent N memory locations in the PLC blocks region 116a accessed for read commands from the host device 120. For example, the memory controller 112 can use the data identification management unit 140 to track the 16 most recent memory locations that are read in the PLC blocks region 116b, with N=16. As another example, the memory controller 112 can use the data identification management unit 140 to track the 32, 64 or 128 most recent memory locations that are read in the PLC blocks region 116b, with N=32, 64 or 128, respectively. In such implementations, the data for all the memory locations corresponding to entries A_1, A_2, A_3, A_4, A_5, A_6, . . . , A_N are copied to the SLC cache memory 116c.

In some implementations, in the technique 200A, data corresponding to all the N entries are mirrored to the SLC cache memory 116c, and read commands directed to corresponding memory locations in the PLC blocks region 116a are satisfied by accessing the mirrored copy of the data from the corresponding memory location in the SLC cache memory 116c, without accessing the PLC blocks region 116a. The number of entries N is determined depending on the size of the SLC cache memory 116c. In some implementations, N is set at the time of manufacture of the memory device 110. In some implementations, N is a configurable parameter that is set by a user of the memory device 110, for example, through a user interface. In some implementations, N is dynamically determined by the memory controller 112 during runtime of the memory device 110, for example, depending on the number or frequency, or both, of read commands received from the host device 120, and the size of the SLC cache memory 116c.

When the memory controller 112 receives a new read command from the host device 120 for a target memory location A_x in the PLC blocks region 116a (which is indicated, for example, by information included with the read command), the memory controller 112 determines whether the target memory location A_x is already mirrored in the SLC cache memory 116c, for example, to a memory location corresponding to one of the entries A_1, A_2, A_3, A_4, A_5, A_6, . . . , A_N. If there is a miss—for example, when A_x represents a memory location that is not mirrored to the SLC cache memory 116c, as shown in FIG. 2A—the memory controller copies the data from the target memory location in the PLC blocks region 116a to a memory location in the SLC cache memory 116c, and inserts the corresponding entry as the first entry in the read tracking data structure, for example, at the head of the data structure, indicating that the associated memory location in the SLC cache memory 116c is accessed for the most recent read command.

On the other hand, if there is a hit—for example, when A_x represents a memory location that is already mirrored to the SLC cache memory 116c—the memory controller services the read command from the mirrored data in the corresponding memory location in the SLC cache memory 116c, without accessing the PLC blocks region 116a. If the corresponding entry in the read tracking data structure was not at the head, then the memory controller 112 moves the entry to be the first entry at the head of the read tracking data structure. The memory controller also shifts the other existing entries in the read tracking data structure right, for example, away from the head and towards the tail, lowering their priority to indicate that respective memory locations have been accessed less frequently compared to the A_x entry at the head (which now has the highest priority).

In some implementations, the SLC cache memory 116c is full, and all N entries in the read tracking data structure corresponding to existing data in the SLC cache memory 116c. In such implementations, when A_x is a new entry being added to the read tracking data structure, for example, when there is a miss as described above, then the memory controller 112 evicts existing data from one of the memory locations in the SLC cache memory 116c to make space for the new entry. For example, as shown in FIG. 2A, in some cases, the memory controller 112 evicts the least recently used (LRU) data from the SLC cache memory 116c, releasing the corresponding memory unit (for example, block or page) in the cache memory. The corresponding entry in the read tracking data structure is at the tail of the read tracking data structure, for example, entry A_N; upon evicting the LRU data from the SLC cache memory 116c, the memory controller 112 removes the corresponding entry A_N from the read tracking data structure. The updated read tracking data structure, following insertion of the new entry A_x at the head and removal of the LRU entry A_N at the tail, looks as shown in the bottom portion of FIG. 2A.

In some implementations, when freeing up space in the SLC cache memory 116c, the memory controller 112 programs the data to a memory location in the PLC blocks region 116a, in case the data was not already present in the PLC blocks region 116a. In some implementations, the memory controller 112 also updates the entry in the address translation table (described below with respect to FIG. 3) that maps the logical address known to the host device to the memory location in the PLC blocks region 116b and the corresponding memory location in the SLC cache memory 116c. Upon releasing the memory location in the SLC cache memory 116c, the memory controller 112, removes the address of the SLC cache memory location from the entry in the address translation table.

Figure 2B:
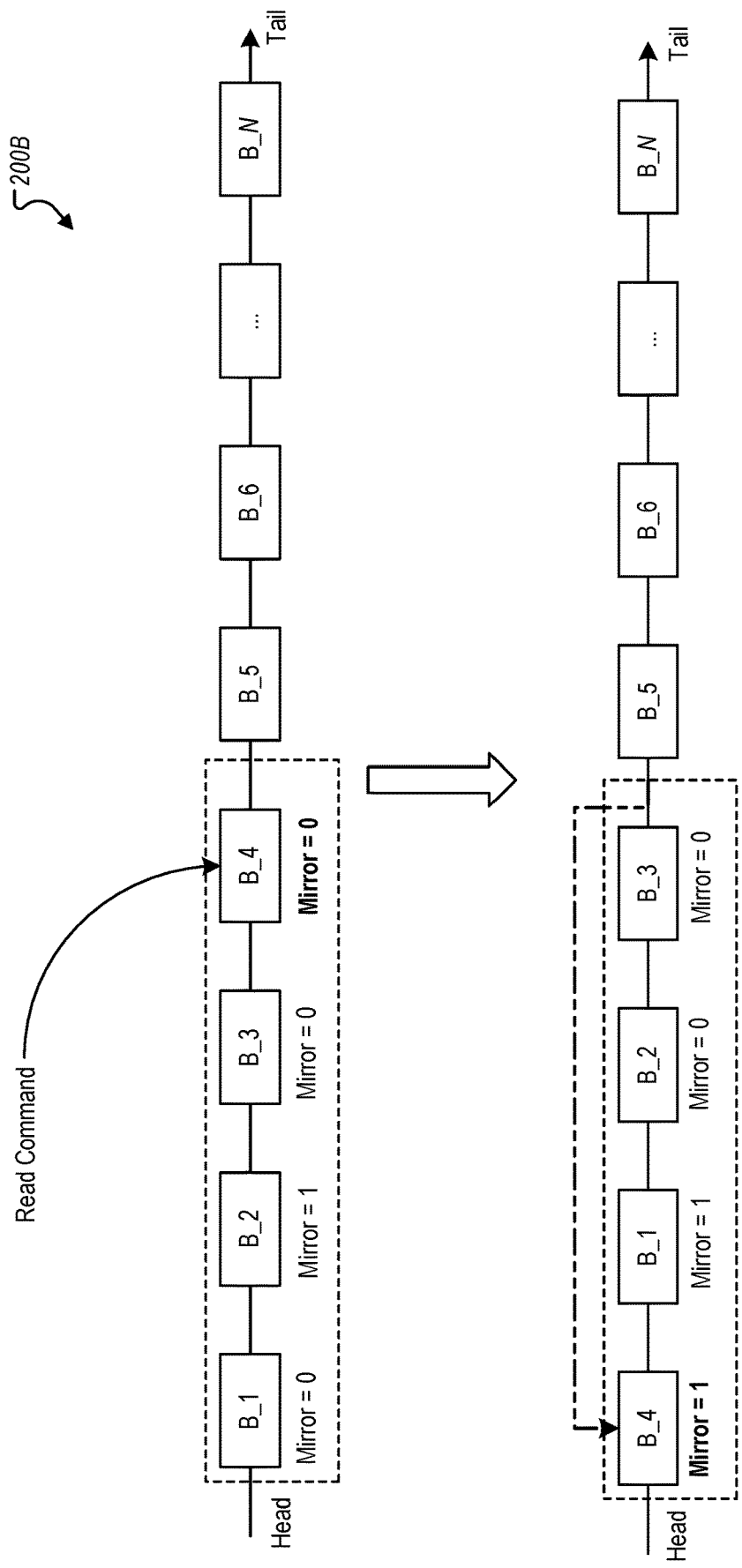

In some implementations, the memory controller 112 uses the technique 200B illustrated with respect to FIG. 2B. As shown in the figure, the read tracking data structure includes N entries B_1, B_2, B_3, B_4, B_5, B_6, up to B_N, which correspond to N memory locations in the PLC blocks region 116a accessed most recently for read commands from the host device 120. In some implementations, the entries B_1, B_2, B_3, B_4, B_5, B_6, . . . , B_N are similar to the entries A_1, A_2, A_3, A_4, A_5, A_6, . . . , A_N discussed with respect to the technique 200A.

In some implementations, in the technique 200B, the memory controller 112 tracks, in addition to tracking the N most recently accessed memory locations in the PLC blocks region 116a, a subset P of these N memory locations that have been accessed within a delta window, which is a specified subset of the recent read commands. For example, the delta window can include memory locations targeted in read commands within the last 4 entries. FIG. 2B shows that, of the N entries B_1, B_2, B_3, B_4, B_5, B_6, . . . , B_N in the read tracking data structure, entries B_1, B_2, B_3 and B_4 correspond to memory locations in the delta window (here P=4)—which are memory locations in the PLC blocks region 116a for which read commands have been received, by the memory device 110 from the host device 120, within the specified delta window of the most recent 4 entries.

In some implementations, the delta window is set at the time of manufacture of the memory device 110. In some implementations, the delta window is a configurable parameter that is set by a user of the memory device 110, for example, through a user interface. In some implementations, the delta window is dynamically determined by the memory controller 112 during runtime of the memory device 110, for example, depending on the number or frequency, or both, of read commands received from the host device 120, and the size of the SLC cache memory 116c.

In implementations that use the technique 200B, the memory controller 112 associates, with each read tracking data structure entry in the delta window, a data mirror flag to indicate whether the corresponding data is mirrored (copied) from the PLC blocks region 116a to the SLC cache memory 116c. If the data mirror flag for an entry is set to the "copy" value (which can be, for example, "1" or "0," depending on the implementation), then the corresponding data is mirrored from the PLC blocks region 116a to the SLC cache memory 116c. For example, the copy value can be "1" in some cases. As shown in FIG. 2B, of the entries B_1, B_2, B_3 and B_4 included in the delta window, the entry B_2 has the data mirror flag set to the copy value "1" (mirror=1), while the other three entries each has the respective data mirror flag set to the copy value "0" (mirror=0). In such cases, memory data corresponding to entry B_2 is mirrored from a corresponding memory location in the PLC blocks region 116a to a memory location in the SLC cache memory 116c, while memory data corresponding to entries B_1, B_3 or B_4 are not mirrored. In such implementations, the memory controller 112 does not mirror memory data corresponding to other entries in the read tracking data structure that are outside the delta window, for example, entries B_5, B_6, . . . , B_N in FIG. 2B that are outside the delta window.

In the technique 200B, upon receiving a new read command, the memory controller 112 checks whether the target memory location for the read command corresponds to an entry in the delta window of the read tracking data structure, which indicates that the memory location was previously accessed very recently. If a corresponding entry exists in the delta window, then the memory controller 112 also checks whether the data mirror flag for the entry is set to the copy value, indicating that the corresponding memory data is mirrored to a memory location in the SLC cache memory 116c. If the data mirror flag is set to the copy value, then the memory controller 112 accesses the mirrored data from the SLC cache memory 116c to respond to the read command. Otherwise, the memory controller 112 accesses the mirrored data from the SLC cache memory 116c, and also sets the data mirror flag for the tracking data structure entry to the copy value. In either case, the memory controller 112 moves the entry to the head of the tracking data structure as the first entry, indicating that the corresponding memory location has been accessed by the most recent read command.

FIG. 2B shows an example where a new read command is received, targeted at a memory location in the PLC blocks region 116a that corresponds to entry B_4 in the read tracking data structure. The memory controller 112 determines that the entry corresponding to the read command (B_4) is present in the read tracking data structure, and further, the entry is within the delta window, with an associated data mirror flag. Upon making the determination, the memory controller 112 checks the data mirror flag for the entry B_4, and determines that the flag is not set to the copy value (as shown, data mirror flag mirror=0 where copy value is "1" in the example), which indicates that the corresponding memory data is not mirrored in the SLC cache memory 116c. The memory controller 112 hence accesses the memory data from a memory location in the PLC blocks region 116a. For the entry B_4, the memory controller 112 moves the entry to the head of the read tracking data structure and sets the data mirror flag for the entry to the copy value (mirror=1). The resulting organization of the read tracking data structure is shown in the bottom half of FIG. 2B.

In some cases, upon receiving a new read command, the memory controller 112 determines that an entry corresponding to the target memory location for the read command is present in the read tracking data structure but outside the delta window. In such cases, the memory controller 112 moves the entry to the head of the read tracking data structure, which results in the entry being included in the delta window. The memory controller also associates a data mirror flag with the entry, setting the value of the data mirror flag to no copy value (mirror=0). The memory data for the read command is accessed from the target memory location in the PLC blocks region 116a.

In some cases, upon receiving a new read command, the memory controller 112 determines that an entry corresponding to the target memory location for the read command is not present in the read tracking data structure. In such cases, the memory controller 112 accesses the memory data for the read command from the target memory location in the PLC blocks region 116a. The memory controller 112 also adds a new entry corresponding to the target memory location to the head of the read tracking data structure, which results in the entry being included in the delta window, and associates a data mirror flag with the entry, setting the value of the data mirror flag to no copy value (mirror=0). When adding a new entry to the read tracking data structure, if an existing entry has to be evicted (for example, the entry B_N at the tail of the read tracking data structure), the memory controller 112 follows the eviction mechanism as discussed previously with respect to the technique 200A.

In the above manner, the technique 200B, with the delta window and the data mirror flag, enables the memory controller 112 to limit the number of memory locations that are mirrored in the SLC cache memory 116c. This can be useful, for example, when the size of the SLC cache memory 116c is limited to the extent that the SLC cache memory cannot accommodate storing memory data of all N read tracking data structure entries, such as when there are a large number of recent read commands from the host device 120 in general, and in particular, a burst in read commands received within the delta window. In such cases, the memory controller 112 focuses on mirroring only the "very hot" entries within the delta window at or near the head of the read tracking data structure. For example, as described by the examples above, the memory controller 12 mirrors memory data corresponding to entries for which a plurality of read commands are received within the delta window.

Figure 2C:
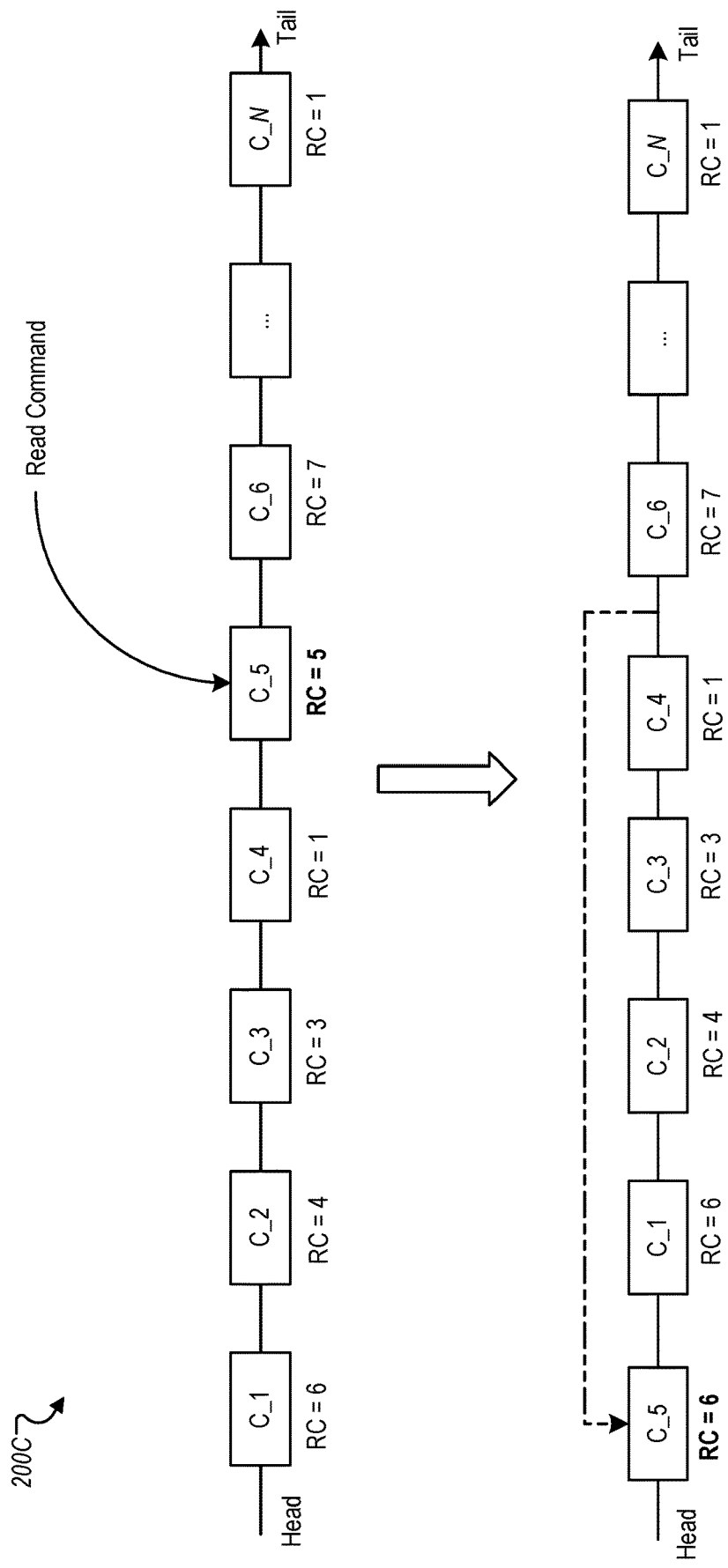

In some implementations, the memory controller 112 uses the technique 200C illustrated with respect to FIG. 2C. As shown in the figure, the read tracking data structure includes N entries C_1, C_2, C_3, C_4, C_5, C_6, up to C_N, which correspond to N memory locations in the PLC blocks region 116a accessed most recently for read commands from the host device 120. In some implementations, the entries C_1, C_2, C_3, C_4, C_5, C_6, . . . , C_N are similar to the entries A_1, A_2, A_3, A_4, A_5, A_6, . . . , A_N discussed with respect to the technique 200A.

In some implementations, in the technique 200C, the memory controller 112 tracks, in addition to tracking the N most recently accessed memory locations in the PLC blocks region 116a, a read count (RC) for each of these N memory locations. In this context, a read count for an entry in the read tracking data structure indicates the number of times the corresponding memory location has been accessed for read commands during the time period the entry is included in the read tracking data structure. For example, as shown in FIG. 2C, the entry C_1 corresponds to a memory location that has been accessed 6 times while included in the read tracking data structure (RC=6), while the entry C_2 corresponds to a memory location that has been accessed 4 times while included in the read tracking data structure (RC=4), among others. Every time a memory location is the target of a read command, the memory controller 112 increments the read count by 1.

In implementations that use the technique 200B, the memory controller 112 also maintains a specified RC threshold value. For entries in the read tracking data structure whose read counts satisfy the RC threshold value under an applicable metric (for example, equals or exceeds the RC threshold value), the memory controller 112 mirrors the corresponding memory data from the respective memory location in the PLC blocks region 116a to the SLC cache memory 116c. As an example, the specified RC threshold value can be 5 in some cases, and the memory controller 112 mirrors those memory locations whose read counts are greater than the RC threshold value. In such cases, considering the illustrated entries of the read tracking data structure in FIG. 2C, the memory controller 112 mirrors memory data corresponding to entry C_1 and C_6 to the SLC cache memory 116c, since the respective read counts are 6 and 7, which are greater than the RC threshold value of 5. The other entries, for example, C_2, C_3, C_4, C_5, or C_N, although included in the read tracking data structure, do not have memory data mirrored to the SLC cache memory 116c since their respective read counts (RC=4, 3, 1, 5, or 1) are less than the RC threshold value of 5.

In some implementations, the RC threshold value is set at the time of manufacture of the memory device 110. In some implementations, the RC threshold value is a configurable parameter that is set by a user of the memory device 110, for example, through a user interface. In some implementations, the RC threshold value is dynamically determined by the memory controller 112 during runtime of the memory device 110, for example, depending on the number or frequency, or both, of read commands received from the host device 120, and the size of the SLC cache memory 116c.

In the technique 200C, upon receiving a new read command, the memory controller 112 checks whether the target memory location for the read command corresponds to an entry in the read tracking data structure, which indicates that the memory location was previously accessed recently. If a corresponding entry exists in the delta window, then the memory controller 112 determines the read count for the entry, and compares the read count to the RC threshold value. If the read count satisfies (for example, is equal to or greater than) the RC threshold value, then the corresponding memory data is already mirrored to a memory location in the SLC cache memory 116c. In this case, the memory controller 112 accesses the mirrored data from the SLC cache memory 116c to respond to the read command. If the read count does not satisfy (for example, is less than) the RC threshold value, then the memory controller 112 access the memory data from the target memory location in the PLC blocks region 116a to respond to the read command. In either case, the memory controller 112 also increments the read count for the entry in the read tracking data structure, and moves the entry to the head of the read tracking data structure as the first entry, indicating that the corresponding memory location has been accessed by the most recent read command. If the read count did not satisfy the RC threshold value before the increment (indicating that the corresponding memory data was not mirrored to the SLC cache memory 116c), but the incremented read count satisfies the RC threshold value, then the memory controller 112 also mirrors the corresponding memory data from the target memory location in the PLC blocks region 116a to a memory location in the SLC cache memory 116c.

FIG. 2C shows an example where a new read command is received, targeted at a memory location in the PLC blocks region 116a that corresponds to entry C_5 in the read tracking data structure. The memory controller 112 determines that the entry corresponding to the read command (C_5) is present in the read tracking data structure, and further, the read count associated with the entry is 5 (RC=5). For this example, the RC threshold value is 6, and entries with read counts greater than or equal to the RC threshold value have memory data mirrored in the SLC cache memory 116c. Accordingly, for the entry C_5, since its read count 5 is less than the RC threshold value of 6, the memory controller 112 determines the corresponding memory data is not mirrored in the SLC cache memory 116c. The memory controller 112 hence accesses the memory data from the target memory location in the PLC blocks region 116a. For the entry C_5, the memory controller 112 moves the entry to the head of the read tracking data structure and increments the read count to 6 (RC=5+1=6). The resulting organization of the read tracking data structure is shown in the bottom half of FIG. 2C. Since the incremented read count (6) equals the RC threshold value of 6, the memory controller 112 also mirrors the corresponding memory data from the target memory location in the PLC blocks region 116a to a memory location in the SLC cache memory 116c.

In some cases, upon receiving a new read command, the memory controller 112 determines that an entry corresponding to the target memory location for the read command is not present in the read tracking data structure. In such cases, the memory controller 112 accesses the memory data for the read command from the target memory location in the PLC blocks region 116a. The memory controller 112 also adds a new entry corresponding to the target memory location to the head of the read tracking data structure, and associates a read count with the entry, setting the value of the read count to 1 (RC=1). When adding a new entry to the read tracking data structure, if an existing entry has to be evicted (for example, the entry C_N at the tail of the read tracking data structure), the memory controller 112 follows the eviction mechanism as discussed previously with respect to the technique 200A.

In the above manner, using the technique 200C with the read count, the memory controller 112 can limit the number of memory locations that are mirrored in the SLC cache memory 116c to only those memory locations that are accessed multiple times recently. This can be useful, for example, when the size of the SLC cache memory 116c is limited to the extent that the SLC cache memory cannot accommodate storing memory data of all N read tracking data structure entries, such as when there are a large number of recent read commands from the host device 120 in general, and in particular, a burst in read commands received within the delta window. In such cases, the memory controller 112 focuses on mirroring only the "very hot" entries that have been accessed recently a number of times exceeding a certain threshold (for example, RC count threshold) value.

Figure 2D:
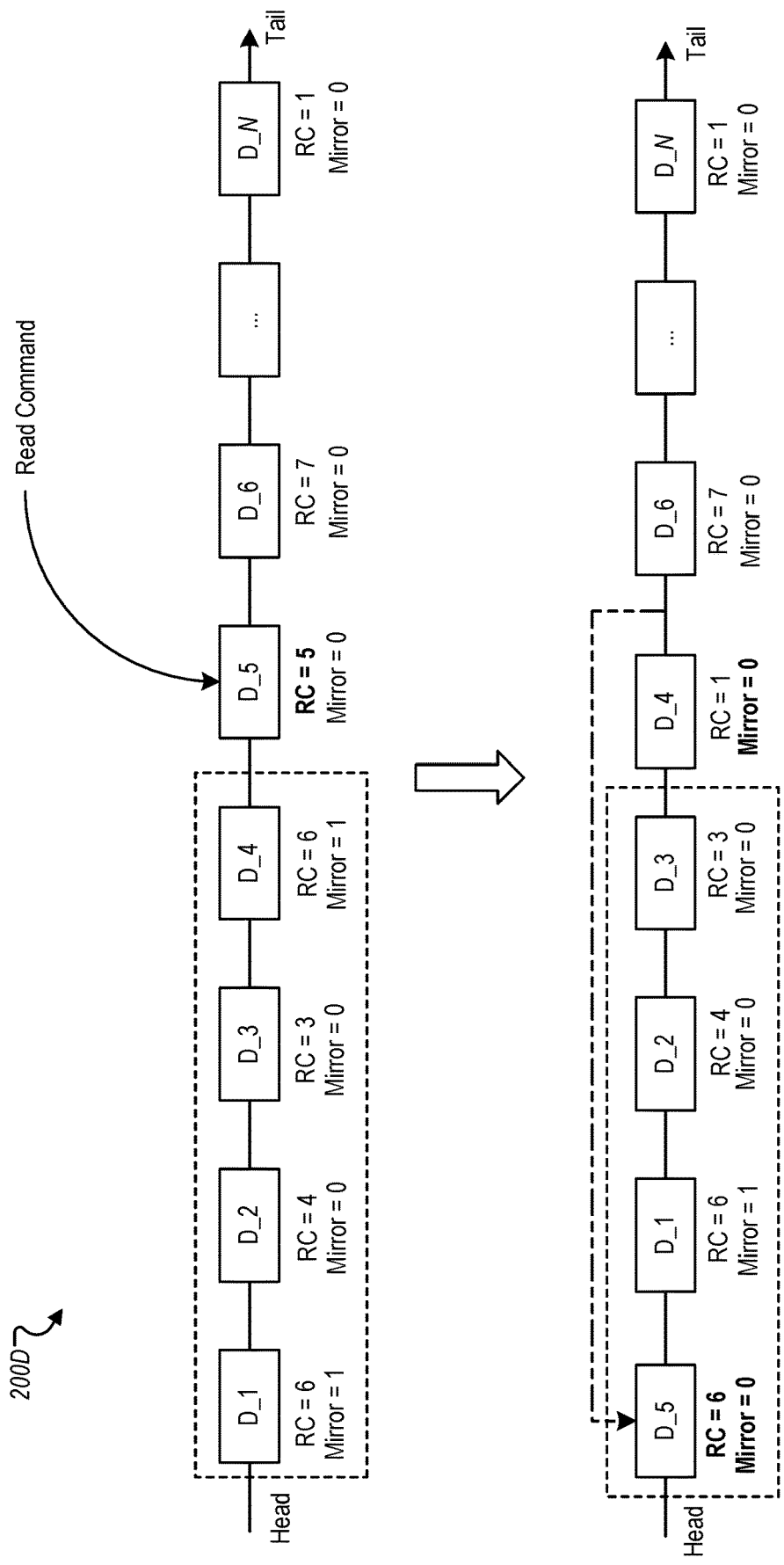

In some implementations, the memory controller 112 uses the technique 200D illustrated with respect to FIG. 2D. As shown in the figure, the read tracking data structure includes N entries D_1, D_2, D_3, D_4, D_5, D_6, up to D_N, which correspond to the most recent N memory locations in the PLC blocks region 116a accessed for read commands from the host device 120. In some implementations, the entries D_1, D_2, D_3, D_4, D_5, D_6, . . . , D_N are similar to the entries A_1, A_2, A_3, A_4, A_5, A_6, . . . , A_N discussed with respect to the technique 200A.

In some implementations, in the technique 200D, the memory controller 112 tracks, in addition to tracking the N most recently accessed memory locations in the PLC blocks region 116a, (a) a subset P of these N memory locations that have been accessed within a delta window, and (b) a read count for each of the corresponding N entries in the read tracking data structure. The delta window is similar to the delta window described previously with respect to the technique 200B, while the read count is similar to the read count described previously with respect to the technique 200C. The memory controller 112 also associates, with each entry in the read tracking data structure, a data mirror flag to indicate whether the corresponding data is mirrored from the PLC blocks region 116a to the SLC cache memory 116c. The data mirror flag for an entry is similar to the data mirror flag discussed with respect to techniques 200B and 200C.

As shown by the example illustrated in FIG. 2D, the entries D_1, D_2, D_3, D_4, D_5, D_6, . . . , D_N are each associated with a read count value and a data mirror flag. For example, entry D_1 has a read count value of 6 (RC=6) and data mirror flag set to the copy value (mirror=1, for examples where the copy value is "1"). Of these N entries, the entries D_1, D_2, D_3 and D_4 included in the delta window (here P=4). The entries D_1 and D_4 each has a read count value of 6 (RC=6). The other entries D_2 and D_3 in the delta window have read count values 4 and 3 respectively. Considering the case where the RC threshold value is 6, memory data corresponding to entries D_1 and D_4 are mirrored from respective memory locations in the PLC blocks region 116a to memory locations in the SLC cache memory 116c, since these entries are in the delta window, and their respective read counts satisfy (for example, equal to or greater than) the RC threshold value. The data mirror flags for D_1 and D_4 are set to the copy value "1" (mirror=1) to indicate that corresponding memory data have been mirrored to the SLC cache memory 116c. In contrast, memory data corresponding to entries D_2 or D_3 are not mirrored since their read count values do not satisfy (for example, less than) the RC threshold value, although these entries are within the delta window. Accordingly, the memory controller 112 sets the data mirror flags for D_2 and D_3 to the no copy value "0" (mirror=0) to indicate that corresponding memory data have not been mirrored to the SLC cache memory 116c. For the entries in the read tracking data structure that are outside the delta window, the memory controller 112 does not mirror corresponding memory data to the SLC cache memory 116c, irrespective of their read count values. For example, entry D_6 has a read count value of 7 (RC=7), which satisfies (being greater than) the RC threshold value of 6. However, memory data corresponding to D_6 is not mirrored to the SLC cache memory 116c, since D_6 is outside the delta window. The value of the data mirror flag for D_6 is set to the no copy value (for example, mirror=0) to reflect that the corresponding memory data has not been mirrored to the SLC cache memory 116c.

In the technique 200D, upon receiving a new read command, the memory controller 112 checks whether the target memory location for the read command corresponds to an entry in the delta window of the read tracking data structure, and whether the read count for the entry satisfies the RC threshold value. If a corresponding entry exists in the delta window and the associated read count satisfies the RC threshold value, then the corresponding memory data is mirrored to a memory location in the SLC cache memory 116c. In such cases, the memory controller 112 accesses the mirrored data from the SLC cache memory 116c to respond to the read command. Otherwise, if a corresponding entry does not exist in the delta window or the associated read count does not satisfy the RC threshold value, or both, the memory controller 112 accesses the mirrored data from the SLC cache memory 116c. In either case, the memory controller 112 moves the entry to the head of the tracking data structure as the first entry, indicating that the corresponding memory location has been accessed by the most recent read command.

FIG. 2D shows an example where a new read command is received. The memory controller 112 determines that entry D_5 in the read tracking data structure corresponds to the target memory location (in the PLC blocks region 116a) of the read command. The memory controller 112 further determines that entry D_5 has a read count of 5, and the entry is outside the delta window, with an associated data mirror flag not set to the copy value (as shown, data mirror flag mirror=0 where copy value is "1" in the example), which indicates that the corresponding memory data is not mirrored in the SLC cache memory 116c. The memory controller 112 hence accesses the memory data from the target memory location in the PLC blocks region 116a. For the entry D_5, the memory controller 112 increments the read count to 6, which results in the read count satisfying the RC threshold value of 6, as shown in the examples above. The memory controller 112 also moves the entry D_5 to the head of the read tracking data structure, causing the entry to be included in the delta window. However, since entry D_5 was outside the delta window at the time the read command was received and serviced, the memory controller does not mirror the corresponding memory data to the SLC cache memory. Accordingly, the data mirror flag for entry D_5 remains at no copy value (mirror=0), even though the entry is included in the delta window following the move, and the read count for the entry satisfies the RC threshold value. In some implementations, as entry D_5 is moved to the head of the read tracking data structure, in the delta window, the least recently used entry in the delta window, D_4, is evicted. In addition to being within the delta window, D_4 had a read count (6) that satisfied the RC threshold value (6 in this example), such that the memory data corresponding to D_4 was mirrored to the SLC cache memory 116c, which is indicated by the data mirror flag for D_4 being set to the copy value (mirror=1) in the top half of FIG. 2D. However, after D_4 is evicted, since the entry is no longer in the delta window, the corresponding memory data is not mirrored to the SLC cache memory 116c any more (even though the read count for D_4 still satisfies the RC threshold value). The memory controller releases the memory location in the SLC cache memory 116c and updates the address translation table to remove the mapping between the memory locations in the PLC blocks region 116a and the SLC cache memory 116c associated with D_4. In the read tracking data structure, the memory controller 112 resets the data mirror flag for D_4 to the no copy value (mirror=0). The resulting organization of the read tracking data structure is shown in the bottom half of FIG. 2D.

In some cases, upon receiving a new read command using the technique 200D, the memory controller 112 determines that an entry corresponding to the target memory location for the read command is not present in the read tracking data structure. In such cases, the memory controller 112 accesses the memory data for the read command from the target memory location in the PLC blocks region 116a. The memory controller 112 also adds a new entry corresponding to the target memory location to the head of the read tracking data structure, which results in the entry being included in the delta window, and sets the read count value for the entry to 1. The memory controller also associates a data mirror flag with the entry, setting the value of the data mirror flag to no copy value (mirror=0). When adding a new entry to the read tracking data structure, if an existing entry has to be evicted (for example, the entry D_N at the tail of the read tracking data structure), the memory controller 112 follows the eviction mechanism as discussed previously with respect to the technique 200A.

In the above manner, the technique 200D enables the memory controller 112 to limit the number of memory locations that are mirrored in the SLC cache memory 116c using the delta window and the read count. This can be useful, for example, when the size of the SLC cache memory 116c is limited to the extent that the SLC cache memory cannot accommodate storing memory data of all N read tracking data structure entries, such as when there are a large number of recent read commands from the host device 120 in general, and in particular, a burst in read commands received within the delta window. In such cases, the memory controller 112 focuses on mirroring memory data corresponding to only those entries for which a certain number of read commands above a threshold value are received within the delta window.

Figure 3:
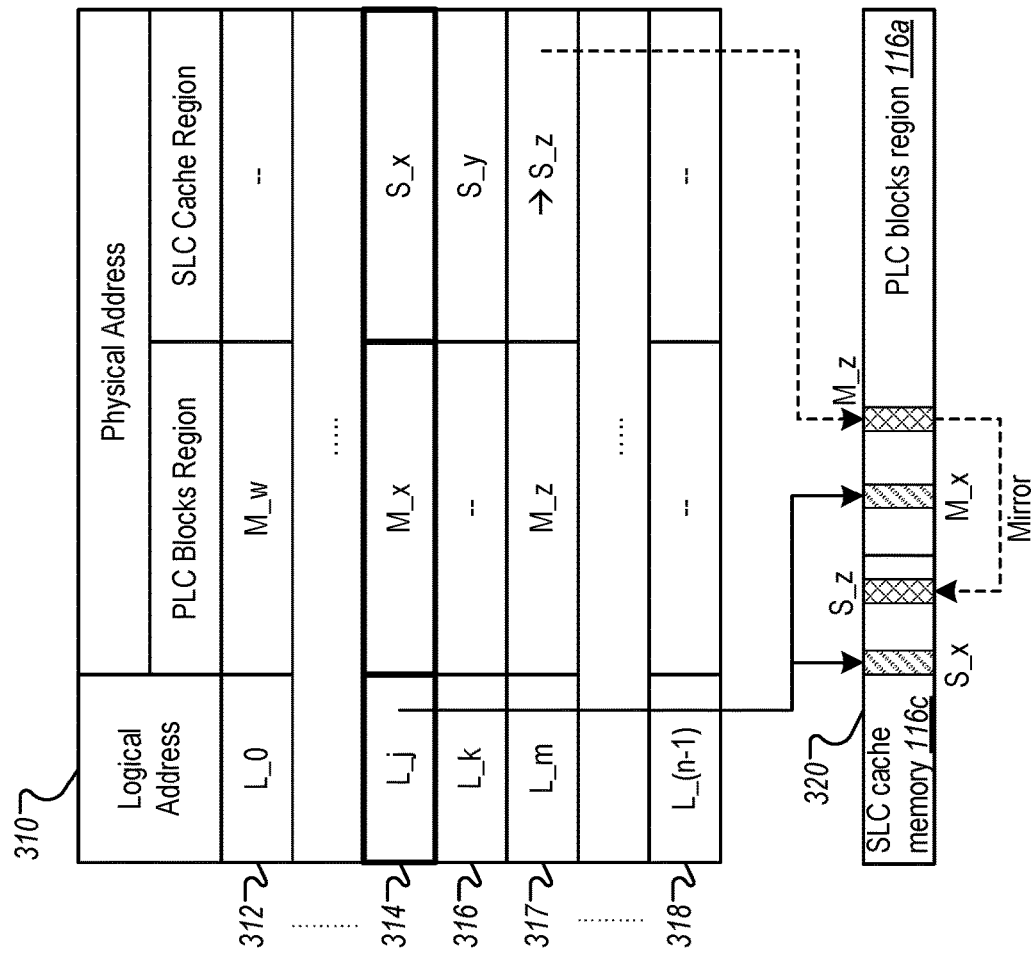
FIG. 3 illustrates an example of an address translation table used by a memory controller to manage entries in a read tracking data structure for recent frequently read memory locations.

FIG. 3 illustrates an example of an address translation table 310 used by a memory controller to manage entries in a read tracking data structure for recent frequently read memory locations. In some implementations, the address translation table 310 is used by the memory controller 112 to manage recent frequently read memory locations in the PLC blocks region 116a that are mirrored to the SLC cache memory 116c, and corresponding entries in the read tracking data structure, as described with respect to techniques 200A-200D. Accordingly, the following sections describe the address translation table with respect to the system 100. In some implementations, the memory controller 112 performs operations on the address translation table 310 as described below using the L2P address management unit 142.

The address translation table 310 includes a plurality of entries 312, 314, 316, 317, . . . , 318. Each entry in the address translation table includes a logical address that is included in read commands from the host device 120 targeted at memory locations in the PLC blocks region 116a in the memory device 110. If memory data corresponding to a read command is available only in the PLC blocks region 116a, then the logical address in the read command is mapped to a physical address of a memory location in the PLC blocks region 116a that stores the memory data. For example, for the entry 312, the logical address L_0 is mapped to the physical address M w in the PLC blocks region 116a. This can be the case, for example, when the memory location with address M w is seldom written or read. In some cases, the address translation table 310 is referred to as logical-to-physical (L2P) mapping table.

When the memory controller 112 receives a read command for the logical address L_0, the memory controller 112 looks up the address translation table 310 and determines that L_0 corresponds to the physical address M w in the PLC blocks region 116a. The memory controller 112 can then service the read command by accessing the memory data from the memory location with physical address M w in the PLC blocks region 116a.

In some cases, if memory data for a memory location in the PLC blocks region 116a is mirrored to a memory location in the SLC cache memory 116c, then the corresponding entry in address translation table also includes the physical address of the memory location in the SLC cache memory 116c. For example, for the entry 314, the logical address L_j is mapped to the physical address M_x in the PLC blocks region 116a, and further to the physical address S_x in the SLC cache memory 116c, indicating that the memory data in the memory location with address M_x in the PLC blocks region 116a is mapped to the memory location with address S_x in the SLC cache memory 116c. This can be the case, for example, when the memory location with address M_x is seldom written but frequently read. When the memory controller 112 receives a read command for the logical address L_j, the memory controller 112 looks up the address translation table 310 and determines that L_0 corresponds to the physical address M_x in the PLC blocks region 116a and also to physical address S_x in the SLC cache memory 116c. The memory controller 112 can then service the read command by accessing the memory data from the memory location with physical address S_x in the SLC cache memory 116c, for faster access and to extend the lifetime of the PLC blocks region 116a, as described previously.

In some cases, memory data corresponding to a read command is available only in the SLC cache memory 116c. In such cases, the logical address in the read command is mapped to a physical address of a memory location in the SLC cache memory 116c that stores the memory data. For example, for the entry 316, the logical address L_k is mapped to the physical address S_y in the SLC cache memory 116c. This can be the case, for example, when the memory location with address S_y is frequently written but seldom read. When the memory controller 112 receives a read command for the logical address L_k, the memory controller 112 looks up the address translation table 310 and determines that L_k corresponds to the physical address S_y in the SLC cache memory 116c. The memory controller 112 can then service the read command by accessing the memory data from the memory location S_y in the SLC cache memory 116c.

In some implementations, whether memory data is stored in the PLC blocks region 116a or the SLC blocks region 116b depends on instructions from the host device 120.

For example, in some cases, the host device 120 specifies, while writing data to the memory device 110, the memory type of the logical unit of data being written—whether the data is SLC type or PLC (for example, one of MLC, TLC, QLC or higher) type. If the host device 120 specifies that data is of SLC type, then the memory controller 112 stores the memory data in the SLC blocks region 116b, irrespective of whether the data is to be stored long term or short term. If the host device 120 specifies that the data is of PLC type, then the memory controller 112 writes the data to memory locations in the PLC blocks region 116a for long term storage. In some of these cases, the memory controller 112 first writes the data to the SLC blocks region 116b, and then migrates the data to the PLC blocks region 116a.

In some cases, when the memory controller 112 services a read command by accessing memory data from the PLC blocks region 116a, the memory controller 112 also copies the memory data to a memory location in the SLC cache memory 116c, as described above with respect to the techniques 200A-200D. In such cases, upon mirroring the memory data from the memory location in the PLC blocks region 116a to a memory location in the SLC cache memory and creating or updating an entry in the read tracking data structure as described previously, the memory controller 112 also updates the corresponding entry in the address translation table 310. For example, the memory controller 112 can receive a read command for logical address L_m, which is mapped to a memory location with physical address M_z in the PLC blocks region 116a, as shown by the entry 317 in the address translation table 310. The memory controller 112 can mirror the memory data from the memory location with physical address M_z in the PLC blocks region 116a to a memory location with physical address S_z in the SLC cache memory 116c, using one of the techniques 200A-200D. Upon doing so, the memory controller updates the entry 317 to include the physical address S_z for the mirrored memory location in the SLC cache memory 116c.

Some logical addresses in the address translation table 310 can be unmapped. This can be the case, for example, when no memory data is written to either the PLC blocks region 116a or the SLC cache memory 116c, or both, for the logical address. For example, the logical address L_(n−1) in the entry 318 is not mapped to any physical address in either the PLC blocks region 116a or the SLC cache memory 116c.

Figure 4:
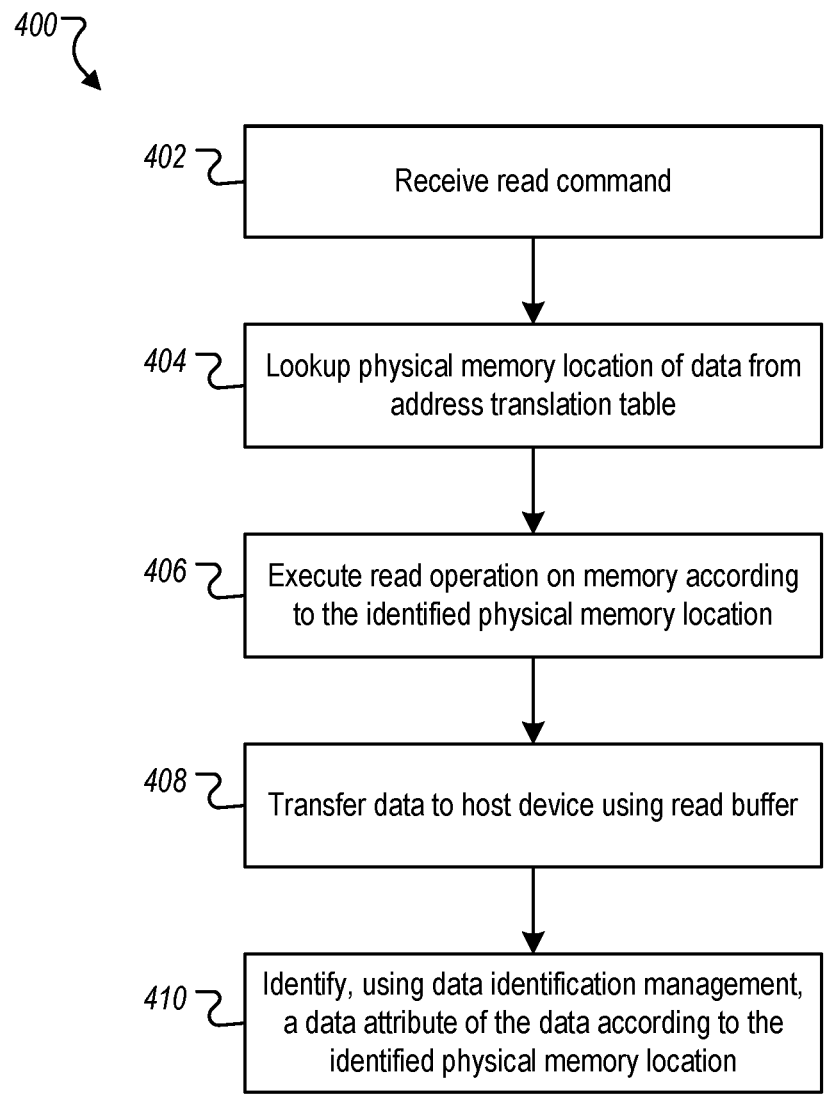
FIG. 4 illustrates an example of a process for a memory controller to service a read command from a host device.

FIG. 4 illustrates an example of a process 400 for a memory controller to service a read command from a host device. In some implementations, the process 400 is performed by the memory controller 112 of the memory device 110 upon receiving a read command from the host device 120. Accordingly, the following sections describe the process 400 with respect to the memory controller 112. However, the process 400 also may be performed by other devices.

The process 400 starts when the memory controller receives a read command (402). For example, the memory controller 112 receives a memory command from the host device 120 through the host I/F 124.

The memory controller looks up the physical memory location of data from the address translation table (404). For example, the memory controller 112 obtains a logical address included in the read command and looks up, in the address translation table 310, an entry corresponding to the logical address, as described above with respect to FIG. 3. Upon finding an entry in the address translation table 310, the memory controller 112 determines the corresponding physical address of a memory location in the PLC blocks region 116a, or the SLC cache memory 116c, or both.

The memory controller executes a read operation on memory according to the identified physical memory location (406). For example, in some implementations, the memory controller 112 determines, following table lookup using the address translation table 310, that the logical address in the read command corresponds to a physical address in the PLC blocks region 116a, for example, as in entry 312. In such implementations, the memory controller obtains the memory data from the memory location in the PLC blocks region 116a identified by the physical address, by accessing the PLC blocks region through the storage I/F 130. In some implementations, the memory controller 112 determines, following table lookup using the address translation table 310, that the logical address in the read command corresponds to a physical address in the SLC cache memory 116c, for example, as in entry 316. In such implementations, the memory controller obtains the memory data from the memory location in the SLC cache memory 116c identified by the physical address, by accessing the SLC cache memory 116c through the storage I/F 130. In some implementations, the memory controller 112 determines, following table lookup using the address translation table 310, that the logical address in the read command corresponds to both a physical address in the PLC blocks region 116a, and a physical address in the SLC cache memory 116c, for example, as in entry 314, indicating that the memory data is mirrored between the two locations. In such implementations, the memory controller obtains the memory data from the memory location in the SLC cache memory 116c, since access from the SLC cache memory 116c is faster, helping to improve read performance, while also improving the lifetime of the PLC blocks region 116a, as discussed previously.

The memory controller transfers data to the host device using the read buffer (408). For example, the memory controller 112 temporarily stores the memory data, obtained from the physical memory location in either the SLC cache memory 116c or the PLC blocks region 116a, in the read buffer 126, and transmits the memory data to the host device 120 over the bus 118 through the host I/F 124.

The memory controller identifies, using data identification management, a data attribute of the data according to the identified physical memory location (410). For example, in some implementations, when the memory controller 112 accesses memory data for a read command from a memory location in the PLC blocks region 116a, the data identification management unit 140 in the memory controller 112 determines a data attribute of the memory location and accordingly performs operations to update the read tracking data structure in the memory controller 112, as described with respect to the techniques 200A-200D and also detailed below.

Figure 5:
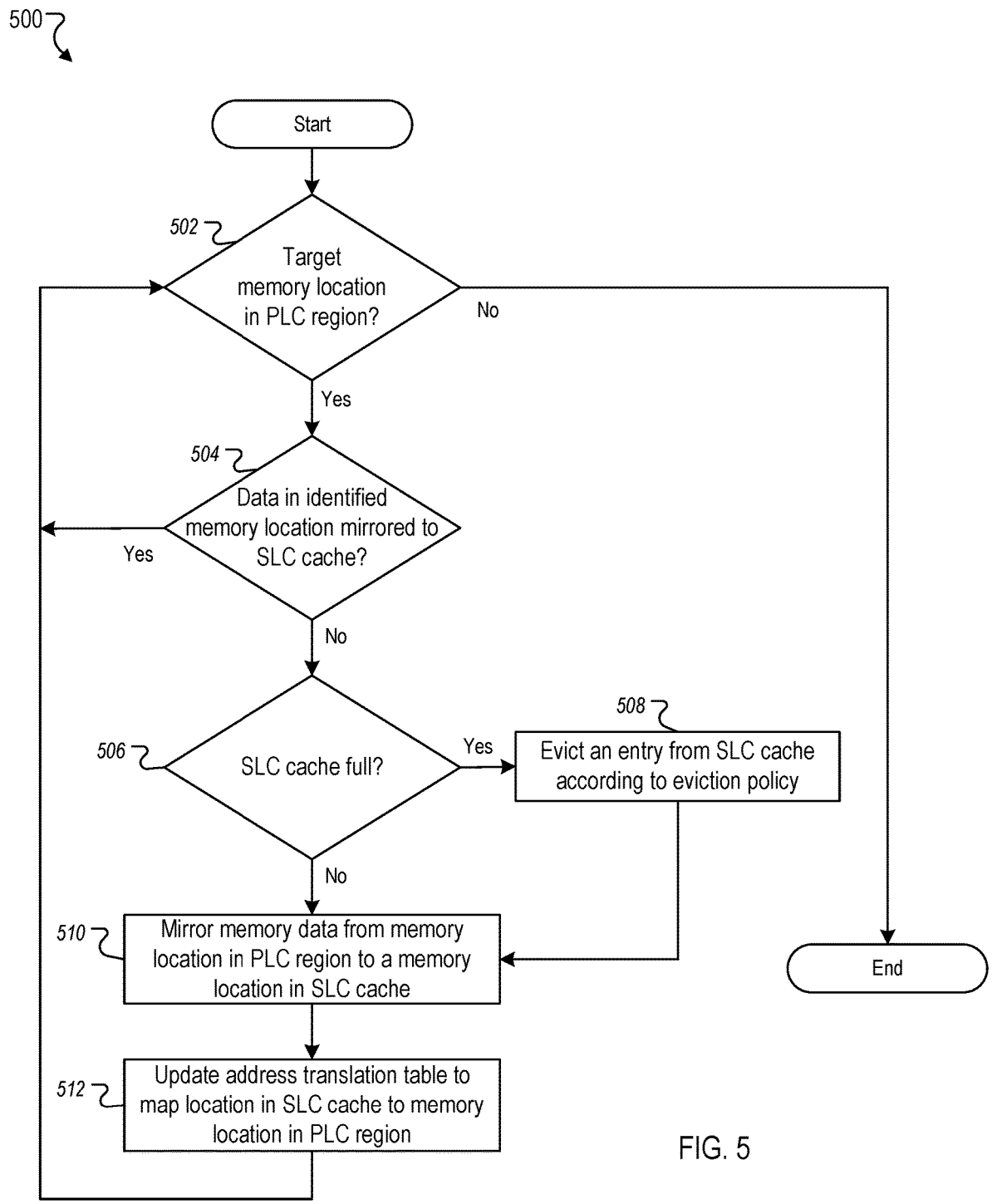
FIG. 5 illustrates an example of a process used by a memory controller to mirror recent frequently read memory data from a long term storage memory to a cache memory in a memory device.

FIG. 5 illustrates an example of a process 500 used by a memory controller to mirror recent frequently read memory data from a long term storage memory to a cache memory in a memory device. In some implementations, the process 500 is performed by the memory controller 112 of the memory device 110 following servicing a read command from the host device 120. For example, in some cases, after the memory controller 112 has completed transfer of memory data to the host device 120 in response to a read command, the memory controller 112 uses the data identification management unit 140 to identify data attribute of the accessed physical memory location, and determine whether to mirror the memory data from the PLC blocks region 116a to the SLC cache memory 116c, including updating the read tracking data structure maintained by the memory controller 112. Accordingly, the following sections describe the process 500 with respect to the memory controller 112. However, the process 500 also may be performed by other devices.

The process 500 starts when the memory controller determines whether a target memory location is in the PLC region (502). For example, upon receiving a read command from the host device 120, the memory controller 112 determines the physical address of the target memory location by performing a lookup of the address translation table 310. In doing so, the memory controller 112 determines whether the target memory location is in the PLC blocks region 116a (for example, entry 312 in the address translation table 310), or in the SLC cache memory 116c (for example, entry 316 in the address translation table 310) or elsewhere in the SLC blocks region 116b.

If the memory controller determines that the target memory location is not in the PLC region, then the process 500 ends. For example, in some implementations, by performing lookup of the address translation table 310, the memory controller 112 determines that the target memory location is in the SLC cache memory 116c (for example, entry 316 in the address translation table 310) or elsewhere in the SLC blocks region 116b. In such implementations, the memory controller 112 services the read command by reading the memory data from the memory location in the SLC cache memory 116c (or elsewhere in the SLC blocks region 116b) and does not need to go mirror the data again in the SLC cache memory 116c.

On the other hand, if the memory controller determines that the target memory location is in the PLC region, then the memory controller further determines whether the memory data in the identified memory location is mirrored to the SLC cache memory (504). For example, in some implementations, by performing lookup of the address translation table 310, the memory controller 112 determines that the target memory location is in the PLC blocks region 116a. The memory controller 112 also determines where the memory data in the target memory location is already mirrored to the SLC cache memory 116c (for example, entry 314 in the address translation table 310) or not yet mirrored to the SLC cache memory 116c (for example, entry 312 in the address translation table 310).

If the memory data is already mirrored from the memory location in the PLC blocks region 116a to a memory location in the SLC cache memory 116c (for example, using one of the techniques 200A-200D), then the memory controller 112 services the read command by reading the memory data from the mirrored memory location in the SLC cache memory 116c. In some implementations, the memory controller then reverts to obtaining memory data for additional logical addresses in the read command by identifying corresponding target memory locations and determining whether they are in the PLC region (502). This can be the case, for example, when the read command includes a plurality of logical addresses for memory locations.

On the other hand, if the memory controller determines that the memory data in the identified memory location is not mirrored to the SLC cache memory, then the memory controller checks whether the SLC cache memory is full (506). For example, in some implementations, upon accessing memory data from the target memory location in the PLC blocks region 116a, the memory controller 112 proceeds to mirror the data to a memory location in the SLC cache memory 116c, using one of techniques 200A-200D. The memory controller 112 can write to a memory location in the SLC cache memory 116c only if there is space available in the cache memory.

If the memory controller determines that the SLC cache memory is full, then the memory controller evicts an entry from SLC cache according to eviction policy (508). For example, when the memory controller 112 proceeds to mirror data from the PLC blocks region 116a to the SLC cache memory 116c and the SLC cache memory 116c is full, the memory controller 112 makes space for the new memory data to be mirrored by evicting one of the existing entries. In some implementations, the memory controller 112 evicts memory data corresponding to the LRU entry, for example, as described with respect to any of techniques 200A-200D. In some implementations, the memory controller 112 writes the evicted memory data to a memory location in the PLC blocks region 116a. The memory controller 112 also updates the corresponding entry in the address translation table 310 to remove the mapping to the SLC cache memory from the entry, such that the updated entry provides a mapping only between the logical memory address and the physical memory address in the PLC blocks region 116a (for example, entry 312).

If the memory controller determines that the SLC cache memory is not full, or upon releasing space in the SLC cache memory by evicting an existing entry, then the memory controller mirrors memory data from the memory location in the PLC region to a memory location in the SLC cache (510). For example, the memory controller 112 mirrors the memory data from the target memory location in the PLC blocks region 116a to an available memory location in the SLC cache memory 116c.

The memory controller updates the address translation table to map the memory location in SLC cache to the memory location in the PLC region (512). For example, upon mirroring the memory data (510), the memory controller 112 also updates the corresponding entry in the address translation table 310. The memory controller adds, to the entry corresponding the target memory location 116a, the physical address of the mirrored memory location in the SLC cache memory 116c (for example, entry 317). The updated entry provides a mapping from the logical memory address to both the physical memory address of the target memory location in the PLC blocks region 116a and the physical memory address of the corresponding mirrored memory location in the SLC cache memory 116c.

The memory controller then reverts to obtaining memory data for additional logical addresses in the read command by identifying corresponding target memory locations and determining whether they are in the PLC region (502). This can be the case, for example, when the read command includes a plurality of logical addresses for memory locations.

Figure 6:
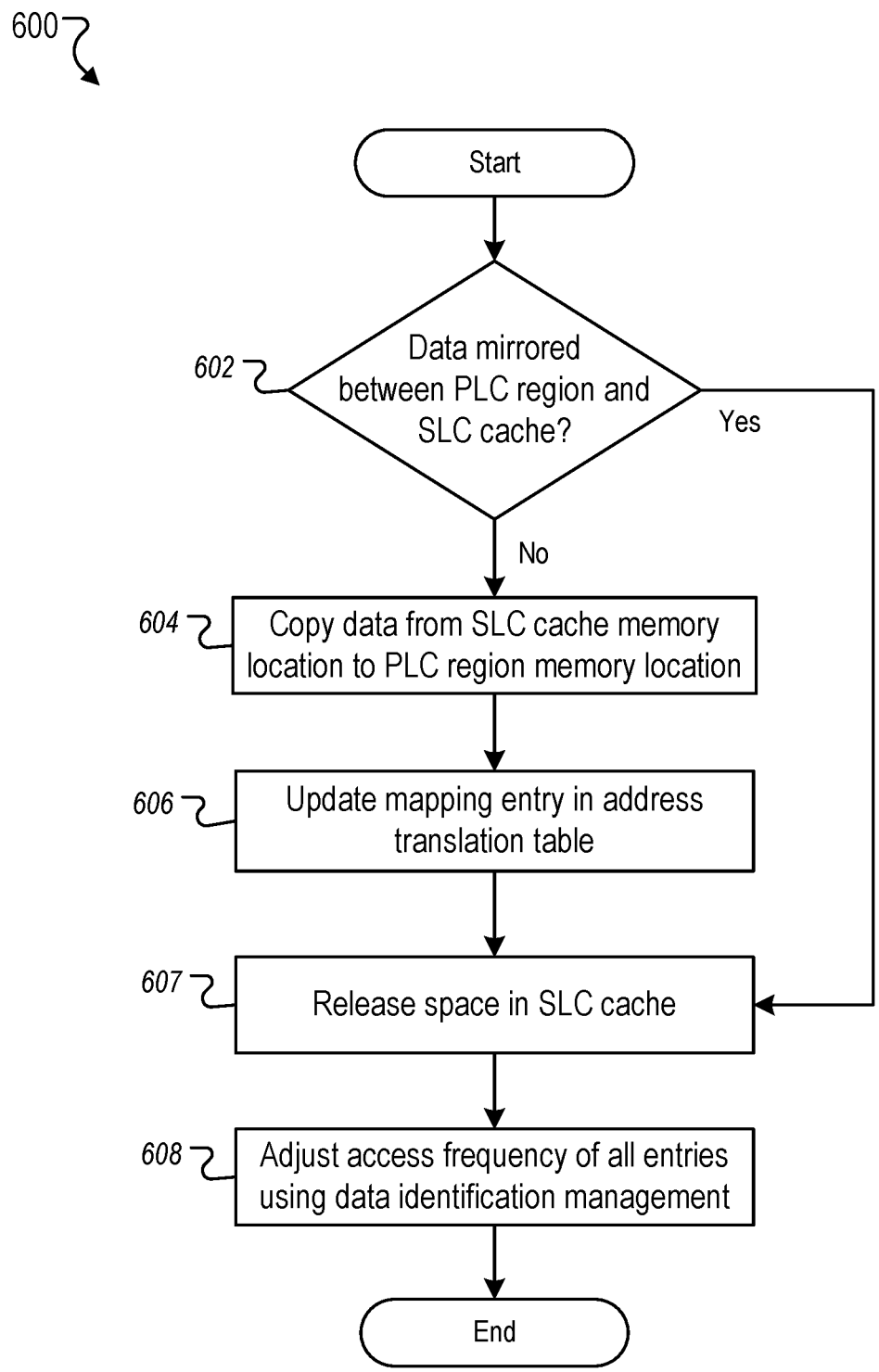
FIG. 6 illustrates an example of a process used by a memory controller to evict data from a SLC cache memory in a memory device.

FIG. 6 illustrates an example of a process 600 used by a memory controller to evict data from a SLC cache memory in a memory device. In some implementations, the process 600 is performed by the memory controller 112 to evict memory data from a memory location in the SLC cache memory 116c, for example, to release space to write newly read memory data, as described with respect to (508) in the process 500. Accordingly, the following sections describe the process 600 with respect to the memory controller 112. However, the process 600 also may be performed by other devices.

The process 600 starts with the memory controller determining whether the memory data to be evicted is mirrored between the PLC region and the SLC cache memory (602). For example, the memory controller 112 checks whether the memory data in the SLC cache memory 116c corresponding to the LRU entry in the read tracking data structure, such as entry A_N in technique 200A, is a copy of memory data present in a memory location in the PLC blocks region 116a.

If the memory controller determines at (602) that the memory data to be evicted was already mirrored between the SLC cache memory and the PLC blocks region, then the memory controller releases space in the SLC cache memory (607). For example, if the memory controller 112 determines that the memory data was already mirrored between the SLC cache memory 116c and the PLC blocks region 116a, then the memory controller 112 simply deletes the address of the memory location of the SLC cache memory 116c mapped in the corresponding entry in the address translation table 310. The resulting entry in the address translation table 310 includes a mapping from a logical address to a physical address of the memory location in the PLC blocks region 116a, for example, as shown by entry 312.

On the other hand, if the memory controller determines that the memory data to be evicted is not mirrored between the PLC region and the SLC cache memory, then the memory controller copies data from the memory location in SLC cache memory to a memory location in PLC region (604). For example, if the memory controller 112 determines that the memory data in the SLC cache memory 116c corresponding to the LRU entry A_N in technique 200A (which is to be evicted) is not a present in the PLC blocks region 116a, then the memory controller copies the memory data from the SLC cache memory 116c to a memory location in the PLC blocks region 116a.

After the memory data is copied to the PLC blocks region, then the memory controller updates the mapping entry in the address translation table (606) and then and releases space in the SLC cache memory (607). For example, if the memory controller 112 programmed a new copy of the memory data to a memory location in the PLC blocks region 116a at (604), then the memory controller updates the corresponding entry in the address translation table 310 to add the physical address of the new memory location in the PLC blocks region 116a where the memory data is copied, and deletes the address of the memory location of the SLC cache memory 116c. The resulting entry in the address translation table 310 includes a mapping from a logical address to a physical address of the memory location in the PLC blocks region 116a, for example, as shown by entry 312.

The process 600 ends with the memory controller adjusting the access frequencies of entries in the read tracking data structure using data identification management (608). For example, the memory controller 112 updates the read counts or data mirror flags, or both, of the entries in the read tracking data structure to reflect the change in the order of entries in the read tracking data structure following eviction of an entry as described above. This is useful, for example, to prevent data attribute distortion.

Figures 7A, 7B:
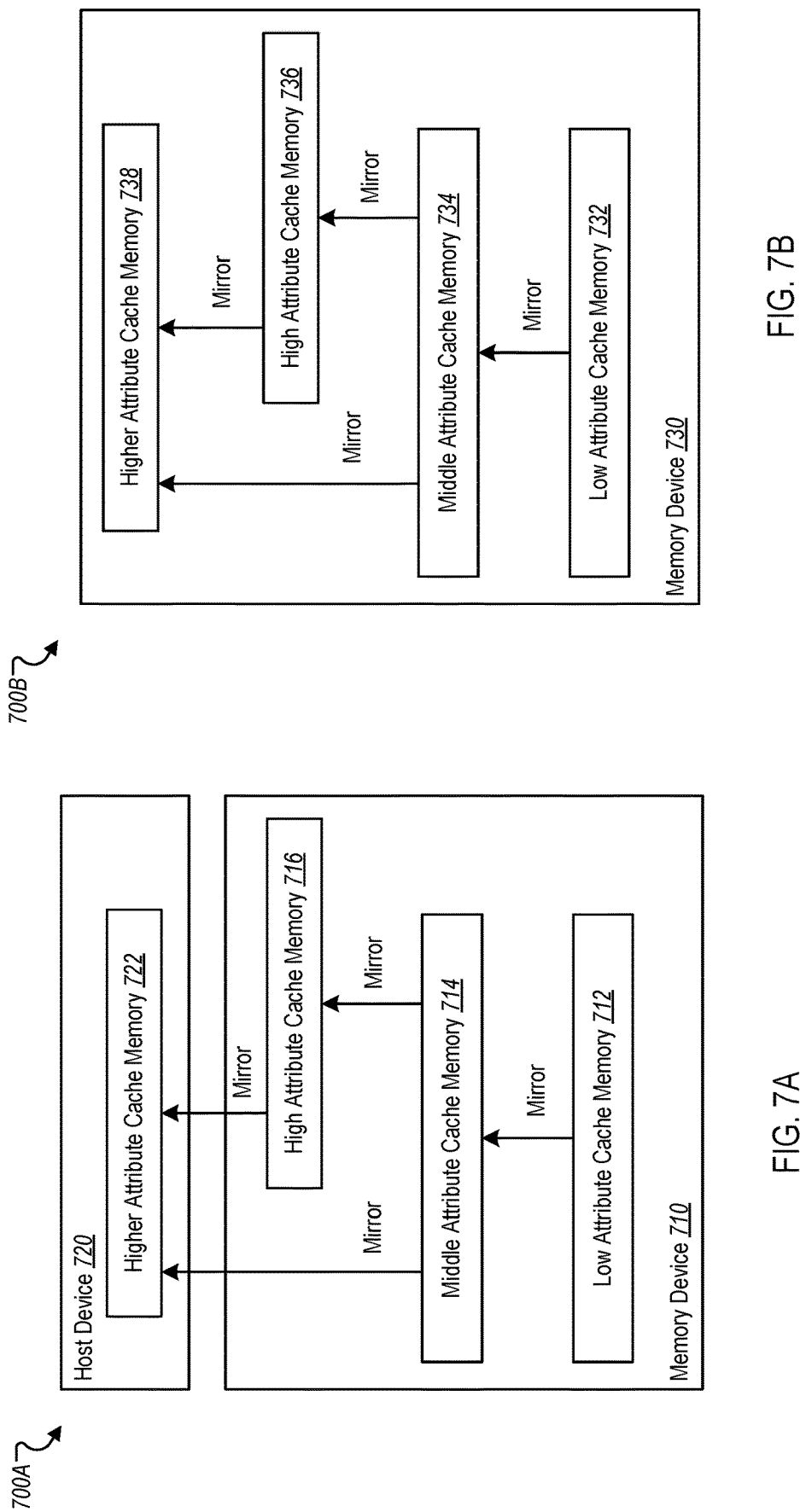
FIGS. 7A and 7B illustrate block diagrams of example systems which use a plurality of cache memories in a memory device for read operations.

FIGS. 7A and 7B illustrate block diagrams of example systems 700A and 700B, respectively, which use a plurality of cache memories in a memory device for read operations. The system 700A shown in FIG. 7A includes a memory device 710 that is communicatively coupled to a host device 720. In some implementations, the memory device 710 and the host device 720 are similar to the memory device 110 and the host device 120, respectively, of system 100, except for the arrangement of cache memory, as described below. As shown, the memory device 710 includes three cache memories: a low attribute cache memory 712, a middle attribute cache memory 714 and a high attribute cache memory 716. The host device 720 includes a higher attribute cache memory 722.

The low attribute cache memory 712 is composed of low endurance or low performance memory, or both, for example, MLC, TLC or QLC memory. In some implementations, the memory controller in the memory device 710 performs a first mirroring of memory data from long term storage (for example, a PLC blocks region) to the low attribute cache memory 712.

The middle attribute cache memory 714 is composed of medium endurance and/or medium performance memory that is superior to MLC/TLC/QLC, for example, SLC memory. In some implementations, the memory controller in the memory device 710 performs a second level of mirroring of memory data from the low attribute cache memory 712 to the middle attribute cache memory 714.

The high attribute cache memory 716 is composed of high endurance and/or high performance memory that is superior to SLC memory, for example, PCM or MRAM. In some implementations, the memory controller in the memory device 710 performs a third level of mirroring of memory data from the middle attribute cache memory 714 to the high attribute cache memory 716.

The higher attribute cache memory 722 is composed of higher endurance and/or higher performance memory that is superior to PCM, MRAM, or SLC, for example, DRAM or another suitable host buffer. In some implementations, the memory controller in the memory device 710 performs a further level of mirroring of memory data from the high attribute cache memory 716 or the middle attribute cache memory 714 to the higher attribute cache memory 722. In some implementations, even though the higher attribute cache memory 722 is in the host device 720, the higher attribute cache memory 722 is controlled by the memory controller in the memory device 710, for example, using Universal Flash Storage (UFS) standard or Peripheral Component Interconnect Express (PCIe) interface standard. The higher attribute cache memory 722 can be, for example, a PCIe open partial host buffer. In some cases, the memory controller uses the Non-Volatile Memory Express (NVMe) communications interface and standard when the higher attribute cache memory 722 is a PCIe-based flash memory.

The memory controller in the memory device 710 uses the different levels of cache memory for memory data that is accessed at different frequencies. The memory controller can apply different mirroring techniques, for example, one or more of the techniques 200A-200D, to mirror memory data to the different levels of cache memory 712, 714, 716 or 722. As an example, the memory controller can use the technique 200A to mirror memory data to the low attribute cache memory 712. The memory controller can mirror a subset of the memory data stored in the low attribute cache memory 712 to the medium attribute cache memory 714 using the technique 200B. The memory controller can mirror a subset of the memory data stored in the medium attribute cache memory 714 to the high attribute cache memory 716 using the technique 200C. Finally, the memory controller can mirror a subset of the memory data stored in the medium attribute cache memory 714 or the high attribute cache memory 716 to the higher attribute cache memory 722 using the technique 200D. Other permutations or combinations of the different levels of cache memory 712, 714, 716 or 722, and the different mirroring techniques 200A-200D are also possible.

The system 700B shown in FIG. 7B includes a memory device 730. In some implementations, the memory device 730 is similar to the memory device 110 of system 100, except for the arrangement of cache memory. As shown, the memory device 730 includes four cache memories: a low attribute cache memory 732, a middle attribute cache memory 734, a high attribute cache memory 736, and a higher attribute cache memory 738.

The memory device 730 of system 700B is largely similar to the memory device 710 of system 700A, except that all cache memory in the system 700B is included in the memory device 730. The low attribute cache memory 732 is similar to the low attribute cache memory 712, the middle attribute cache memory 734 is similar to the middle attribute cache memory 714, and the high attribute cache memory 736 is similar to the high attribute cache memory 716. The higher attribute cache memory 738 is similar to the higher attribute cache memory 722. However, since the higher attribute cache memory 738 is included in the memory device 730 itself, in some implementations, the memory controller in the memory device 730 can directly control the higher attribute cache memory 738, without using UFS or PCIe. The memory data mirrored in the different levels of cache memories 732, 734, 736 and 738 are similar to the memory data mirrored in the different levels of cache memories 712, 714, 716 and 722, respectively, and the techniques used by the memory controller are similar to those described with respect to the memory device 710.

It is to be noted that although process steps, method steps, algorithms or the like may be described in a sequential order above, such processes, methods and algorithms may generally be configured to work in alternate orders, unless specifically stated to the contrary.

The disclosed and other examples can be implemented as one or more computer program products, for example, one or more modules of computer program instructions encoded on a computer readable medium for execution by, or to control the operation of, data processing apparatus. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform the functions described herein. The processes and logic flows can also be performed by, and apparatus can also be implemented as, special purpose logic circuitry, e.g., an FPGA or an ASIC (application specific integrated circuit).

Processors suitable for the execution of a computer program include, by way of example, both general and special purpose microprocessors, and any one or more processors of any kind of digital computer. Computer readable media suitable for storing computer program instructions and data can include all forms of nonvolatile memory, media and memory devices. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method comprising:
    receiving, at a memory controller managing a memory device, a memory read command, wherein the memory device includes a storage memory comprising a first type of memory cells and a cache memory comprising a second type of memory cells;
    determining, by the memory controller from the memory read command, an address of a target memory location in the storage memory, wherein the target memory location is without an associated memory location in the cache memory;
    executing, by the memory controller, a read operation on the target memory location in the storage memory;
    determining that a particular entry corresponding to the target memory location is present in a data structure that includes a specified plurality of entries indicating recent frequently read memory locations in the storage memory;
    in response to determining that the data structure includes the particular entry corresponding to the target memory location:
        incrementing a read count for the particular entry;
        moving the particular entry to a head of the data structure;
        determining that the incremented read count for the particular entry satisfies a threshold read count value, wherein entries in the data structure with respective read counts satisfying the threshold read count value correspond to memory locations in the storage memory having data mirrored to memory locations in the cache memory; and
        upon determining that the incremented read count for the particular entry satisfies the threshold read count value, copying data from the target memory location in the storage memory to a memory location in the cache memory.

2. The method of claim 1, further comprising:
    receiving, at the memory controller, a second memory read command;
    determining, by the memory controller from the second memory read command, a second address of a second target memory location in the storage memory, wherein the second target memory location is without an associated memory location in the cache memory;
    executing, by the memory controller, a second read operation on the second target memory location in the storage memory;
    determining that an entry corresponding to the second target memory location is not present in the data structure;
    in response to determining that an entry corresponding to the second target memory location is not present in the data structure:
        adding a new entry to the data structure corresponding to the second target memory location in the storage memory; and
        assigning an initial read count for the new entry.

3. The method of claim 2, wherein adding the new entry to the data structure comprises adding the new entry at the head of the data structure.

4. The method of claim 2, wherein adding the new entry to the data structure corresponding to the second target memory location comprises:
determining that the data structure is full;
in response to the determining, identifying a least recently used (LRU) entry in the data structure representing another storage memory location; and
removing the LRU entry from the data structure.

5. The method of claim 4, wherein identifying an existing entry in the data structure comprises:
identifying an existing entry in the data structure representing a storage memory location that has been least recently accessed for a read command in comparison to other storage memory locations represented by other existing entries in the data structure.

6. The method of claim 1, wherein moving the particular entry to a head of the data structure and copying data from the target memory location to the memory location in the cache memory upon determining that the incremented read count for the particular entry satisfies the threshold read count value further comprises:
determining that the particular entry is included in a delta window comprising a subset of entries in the data structure accessed within a known time interval, the subset of entries including an entry at the head of the data structure; and
in response to determining that the particular entry is included in the delta window:
moving the particular entry to the head of the data structure,
determining that the incremented read count for the particular entry satisfies the threshold read count value, and
copying data from the target memory location to the memory location in the cache memory upon determining that the incremented read count for the particular entry satisfies the threshold read count value.

7. The method of claim 6, further comprising:
setting a data mirror flag for the particular entry to indicate that data from the target memory location is copied to the memory location in the cache memory.

8. The method of claim 1, wherein the first type of memory cells in the storage memory includes at least one of a multi-level cell (MLC) memory, a triple-level cell (TLC) memory, or a quad-level cell (QLC) memory, and wherein the second type of memory cells in the cache memory includes a single-level cell (SLC) memory.

9. A memory controller for managing a memory device, the memory controller comprising:
one or more processors; and
one or more machine-readable media storing instructions that, when executed, cause the one or more processors to perform operations comprising:
receiving a memory read command;
determining, from the memory read command, an address of a target memory location in a storage memory of the memory device, wherein the target memory location is without an associated memory location in a cache memory of the memory device, wherein the storage memory comprises a first type of memory cells and the cache memory comprises a second type of memory cells;
executing a read operation on the target memory location in the storage memory;
determining that a particular entry corresponding to the target memory location is present in a data structure that includes a specified plurality of entries indicating recent frequently read memory locations in the storage memory;
in response to determining that the data structure includes the particular entry corresponding to the target memory location:
incrementing a read count for the particular entry;
moving the particular entry to a head of the data structure;
determining that the incremented read count for the particular entry satisfies a threshold read count value, wherein entries in the data structure with respective read counts satisfying the threshold read count value correspond to memory locations in the storage memory having data mirrored to memory locations in the cache memory; and
upon determining that the incremented read count for the particular entry satisfies the threshold read count value, copying data from the target memory location in the storage memory to a memory location in the cache memory.

10. The memory controller of claim 9, wherein the operations further comprise:
receiving a second memory read command;
determining, from the second memory read command, a second address of a second target memory location in the storage memory, wherein the second target memory location is without an associated memory location in the cache memory;
executing a second read operation on the second target memory location in the storage memory;
determining that an entry corresponding to the second target memory location is not present in the data structure;
in response to determining that an entry corresponding to the second target memory location is not present in the data structure:
adding a new entry to the data structure corresponding to the second target memory location in the storage memory; and
assigning an initial read count for the new entry.

11. The memory controller of claim 10, wherein adding the new entry to the data structure corresponding to the second target memory location comprises:
determining that the data structure is full;
in response to the determining, identifying a least recently used (LRU) entry in the data structure representing another storage memory location; and
removing the LRU entry from the data structure.

12. The memory controller of claim 9, wherein moving the particular entry to a head of the data structure and copying data from the target memory location to the memory location in the cache memory upon determining that the incremented read count for the particular entry satisfies the threshold read count value further comprises:
determining that the particular entry is included in a delta window comprising a subset of entries in the data structure accessed within a known time interval, the subset of entries including an entry at the head of the data structure; and
in response to determining that the particular entry is included in the delta window:

moving the particular entry to the head of the data structure,
determining that the incremented read count for the particular entry satisfies the threshold read count value, and
copying data from the target memory location to the memory location in the cache memory upon determining that the incremented read count for the particular entry satisfies the threshold read count value.

13. The memory controller of claim 12, wherein the operations further comprise:
setting a data mirror flag for the particular entry to indicate that data from the target memory location is copied to the memory location in the cache memory.

14. The memory controller of claim 9, wherein the first type of memory cells in the storage memory includes at least one of a multi-level cell (MLC) memory, a triple-level cell (TLC) memory, or a quad-level cell (QLC) memory, and wherein the second type of memory cells in the cache memory includes a single-level cell (SLC) memory.

15. A memory device comprising:
a storage memory including a first type of memory cells;
a cache memory including a second type of memory cells; and
a memory controller to manage the storage memory and the cache memory, wherein the memory controller is configured to perform operations comprising:
receiving a memory read command;
determining, from the memory read command, an address of a target memory location in the storage memory, wherein the target memory location is without an associated memory location in the cache memory;
executing a read operation on the target memory location in the storage memory;
determining that a particular entry corresponding to the target memory location is present in a data structure that includes a specified plurality of entries indicating recent frequently read memory locations in the storage memory;
in response to determining that the data structure includes the particular entry corresponding to the target memory location:
incrementing a read count for the particular entry;
moving the particular entry to a head of the data structure;
determining that the incremented read count for the particular entry satisfies a threshold read count value, wherein entries in the data structure with respective read counts satisfying the threshold read count value correspond to memory locations in the storage memory having data mirrored to memory locations in the cache memory; and
upon determining that the incremented read count for the particular entry satisfies the threshold read count value, copying data from the target memory location in the storage memory to a memory location in the cache memory.

16. The memory device of claim 15, wherein the operations further comprise:

receiving a second memory read command;
determining, from the second memory read command, a second address of a second target memory location in the storage memory, wherein the second target memory location is without an associated memory location in the cache memory;
executing a second read operation on the second target memory location in the storage memory;
determining that an entry corresponding to the second target memory location is not present in the data structure;
in response to determining that an entry corresponding to the second target memory location is not present in the data structure:
adding a new entry to the data structure corresponding to the second target memory location in the storage memory; and
assigning an initial read count for the new entry.

17. The memory device of claim 16, wherein adding the new entry to the data structure corresponding to the second target memory location comprises:
determining that the data structure is full;
in response to the determining, identifying a least recently used (LRU) entry in the data structure representing another storage memory location; and
removing the LRU entry from the data structure.

18. The memory device of claim 15, wherein moving the particular entry to a head of the data structure and copying data from the target memory location to the memory location in the cache memory upon determining that the incremented read count for the particular entry satisfies the threshold read count value further comprises:
determining that the particular entry is included in a delta window comprising a subset of entries in the data structure accessed within a known time interval, the subset of entries including an entry at the head of the data structure; and
in response to determining that the particular entry is included in the delta window:
moving the particular entry to the head of the data structure,
determining that the incremented read count for the particular entry satisfies the threshold read count value, and
copying data from the target memory location to the memory location in the cache memory upon determining that the incremented read count for the particular entry satisfies the threshold read count value.

19. The memory device of claim 18, wherein the operations further comprise:
setting a data mirror flag for the particular entry to indicate that data from the target memory location is copied to the memory location in the cache memory.

20. The memory device of claim 15, wherein the first type of memory cells in the storage memory includes at least one of a multi-level cell (MLC) memory, a triple-level cell (TLC) memory, or a quad-level cell (QLC) memory, and wherein the second type of memory cells in the cache memory includes a single-level cell (SLC) memory.

* * * * *